(12) United States Patent
Singh et al.

(10) Patent No.: US 10,769,352 B2
(45) Date of Patent: Sep. 8, 2020

(54) PROVIDING DYNAMIC WEB CONTENT WITHOUT FLICKER

(71) Applicant: Adobe Inc., San Jose, CA (US)

(72) Inventors: Harpreet Singh, Sector-44A (IN);
Sachin Jain, West Ghonda (IN); Lalit Kishore Sharma, Gautam Buddh Nagar (IN)

(73) Assignee: ADOBE INC., San Jose, CA (US)

( * ) Notice: Subject to any disclaimer, the term of this patent is extended or adjusted under 35 U.S.C. 154(b) by 214 days.

(21) Appl. No.: 15/808,447

(22) Filed: Nov. 9, 2017

(65) Prior Publication Data
US 2019/0138577 A1    May 9, 2019

(51) Int. Cl.
G06F 3/00        (2006.01)
G06F 40/14       (2020.01)
G06F 16/958      (2019.01)

(52) U.S. Cl.
CPC ............ *G06F 40/14* (2020.01); *G06F 16/986* (2019.01)

(58) Field of Classification Search
CPC .............................. G06F 16/986; G06F 40/14
See application file for complete search history.

(56) References Cited

U.S. PATENT DOCUMENTS

2017/0302976 A1* 10/2017 Puttagunta ............ G06F 16/957

* cited by examiner

*Primary Examiner* — Kyle R Stork
(74) *Attorney, Agent, or Firm* — Keller Jolley Preece

(57) ABSTRACT

The present disclosure is directed toward systems, methods, and computer readable media for providing dynamic digital content via a webpage without flicker. For example, systems described herein include receiving a web document including action items associated with rendering dynamic digital content via a display device. The systems and methods described herein can reduce flicker in rendering the dynamic digital content by identifying dynamic digital content, pre-fetching external resources, and selectively hiding dynamic visual elements. In addition, the systems and methods described herein further reduce flicker by generating a dependency graph that reflects dependencies between the action items and then rendering digital content in accordance with an action queue generated based on the dependency graph. Furthermore, systems can individually reveal dynamic visual elements as action items for rendering dynamic digital content via the dynamic visual elements from the dependency graph are completed.

20 Claims, 12 Drawing Sheets

| Visual Element | Modification | Element Visibility | | Reduction in Load Time |
|---|---|---|---|---|
| | | Existing Approach | Proposed | |
| Logo | Image URL & Resize | ~850ms | ~389ms | 461ms (54%) |
| Main Banner | HTML Content | ~958ms | ~389ms | 569ms (59%) |
| Gallery Thumbnail 1 | Image URL | ~1020ms | ~520ms | 500ms (49%) |
| Gallery Thumbnail 2 | Image URL | ~1020ms | ~545ms | 475ms (47%) |
| Heading | Text | ~1035ms | ~321ms | 714ms (69%) |

600

PROVIDING DYNAMIC WEB CONTENT WITHOUT FLICKER

BACKGROUND

Recent years have seen an increase in digital systems that provide dynamic web content to client devices across computer networks. Indeed, it is now common for websites hosted at remote servers to include personalized and adaptive content tailored to individual users of client devices based on user interests, characteristics, or behavior. Delivering dynamic web content from a remote server to client devices based on characteristics of a viewer can result in delivery of more efficient, relevant web content; nevertheless, various problems and drawbacks exist with conventional web content delivery systems.

For example, conventional web content delivery systems routinely cause flicker when loading and rendering dynamic web content as part of providing a webpage display. In particular, conventional web content delivery systems render webpages with certain elements or portions that abruptly change (i.e., flicker) as the webpage loads. This flicker generally appears as conventional web content delivery systems render dynamic content in place of default content within the website. As a result, conventional web content delivery systems often render webpages in a jolting and disruptive manner, particularly where a large number of dynamic elements are modified while loading the webpage.

Improper delivery of content due to flicker is not only jarring, but can result in erroneous impressions and/or selections. For example, conventional web content delivery systems can expose users to conflicting or inaccurate information (e.g., provide default content that is then replaced with more accurate or conflicting targeted content on a webpage). Moreover, conventional web content delivery systems can cause users to errantly select improper links of a webpage as default content is replaced by dynamic content. Flicker caused by conventional web content delivery systems often leads viewers to abandon a webpage in favor of other digital destinations.

Some conventional systems attempt to reduce or eliminate flicker by masking or hiding a webpage display until a webpage finishes loading. For example, many conventional systems hide an entire webpage (by providing a blank screen for display) and then reveal the webpage when all the web content has been prepared for display. Hiding a webpage display, however, results in unnecessary delay in web content delivery, which leads to user dissatisfaction. Thus, in seeking to resolve problems caused by flicker, these conventional systems lead to the same result: webpage abandonment.

The problems associated with conventional systems are only exacerbated by the time required by conventional processes to load dynamic content on a web page. Indeed, conventional systems generally process web documents utilizing a brute force method that performs actions sequentially based on how the actions are encoded in a web document. Thus, conventional systems often inefficiently perform actions in a manner that slows the time required to render the webpage. This exacerbates the problems described above, prolonging flicker and/or unnecessary time periods displaying blank content.

These and other problems exist with regard to providing dynamic web content.

SUMMARY

Embodiments of the present disclosure provide benefits and/or solve one or more of the foregoing and other problems in the art with systems, methods, and computer readable media that quickly and efficiently provide dynamic web content without flicker. In particular, in one or more embodiments, the disclosed systems intelligently pre-process action items from a web document (e.g., an HTML document) and calculate a dependency graph to determine an order (i.e., an action queue) for efficiently applying action items to render a webpage. Moreover, the disclosed systems can selectively hide dynamic visual elements while applying the action items according to the action queue to render the webpage without flicker.

For example, in one or more embodiments, the disclosed systems pre-process a web document (i.e., an HTML document) to identify action items for rendering dynamic digital content in dynamic visual elements and also to determine dependencies. Specifically, the disclosed systems can generate a dependency graph that reflects dependencies between action items in the web document for rendering the webpage. Moreover, based on the pre-processed action items, the disclosed systems can pre-fetch remote digital content and hide dynamic visual elements. Moreover, the disclosed systems can then efficiently perform action items for rendering the webpage. Specifically, the disclosed systems can utilize the dependency graph to generate an action queue for performing action items. Furthermore, upon completion of the action items corresponding to any particular dynamic visual element within the dependency graph, the disclosed systems can reveal (e.g., unhide) the hidden dynamic visual elements and provide the dynamic visual elements for display.

Utilizing this approach, the disclosed systems can solve many of the problems associated with conventional content delivery systems. For example, by selectively hiding (and revealing) dynamic visual elements (e.g., based on pre-identified dynamic action items and a dependency graph), the disclosed systems can avoid flicker caused by replacing default digital content with dynamic digital content. Moreover, the disclosed systems can avoid unnecessary delays in providing digital content by intelligently displaying individual dynamic visual elements as each dynamic visual element is ready for display. Furthermore, the disclosed systems can improve efficiency and speed of providing webpages by utilizing an intelligent order of actions based on a dependency graph for rendering dynamic digital content of the webpage.

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which.

DETAILED DESCRIPTION

Figure 1B:
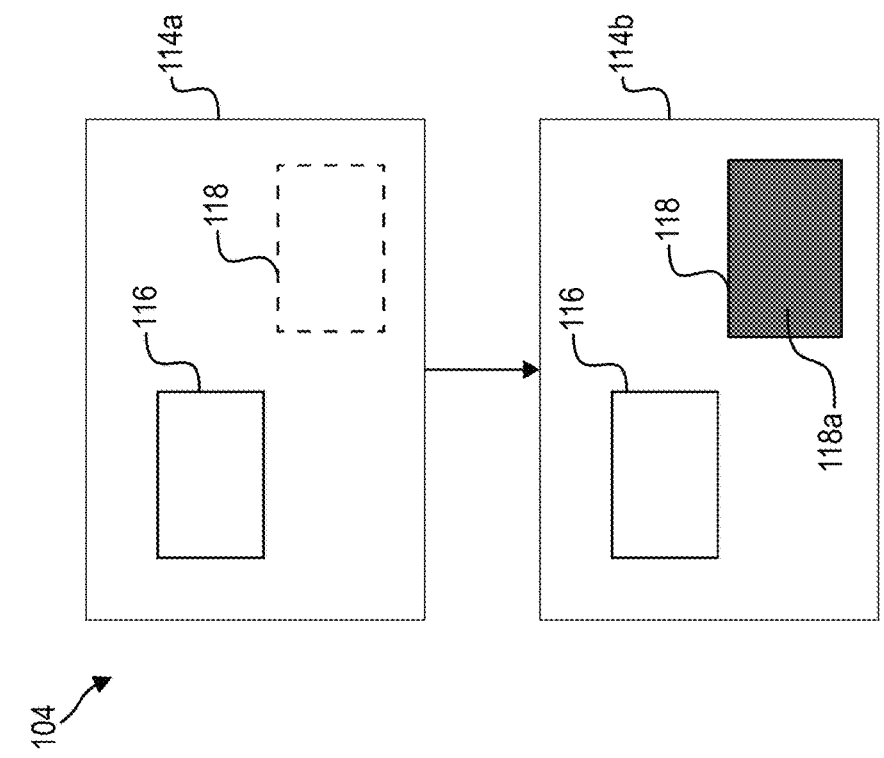
FIG. 1B illustrates an example webpage in which dynamic digital content is provided in accordance with one or more embodiments of a dynamic content rendering system.

One or more embodiments of the present disclosure include a dynamic content rendering system that facilitates efficient and swift delivery of dynamic web content without flicker. In particular, the dynamic content rendering system can intelligently pre-process action items from a web document to render a webpage without displaying default digital content within dynamic visual elements. For example, prior to performing action items for rendering a webpage, the dynamic content rendering system can determine dependencies corresponding to the action items. The dynamic content rendering system can then utilize the dependencies to efficiently render a webpage without flicker. Specifically, in one or more embodiments, the dynamic content rendering systems identifies and selectively hides dynamic visual elements, intelligently applies action items according to a dependency graph, and individually surfaces the dynamic visual elements for display in the webpage.

To illustrate, upon receiving a web document, the dynamic content rendering system can identify action items associated with rendering dynamic digital content. Based on the identified action items, the dynamic content rendering system can pre-fetch digital content and selectively hide dynamic visual elements. In addition, the dynamic content rendering system can generate a dependency graph (e.g., a graph that reflects dependencies between action items) and perform action items in accordance with the identified dependencies. Specifically, the dynamic content rendering system can generate an action queue of independent action items from the dependency graph and perform the independent action items. The dynamic content rendering system can then determine when action items have been completed and individually provide the dynamic visual elements for display. In this manner, the dynamic content rendering system can efficiently and quickly provide dynamic digital content for display in a webpage without flicker.

As just mentioned, the dynamic content rendering system can receive a web document including action items associated with rendering a webpage. For example, in response to detecting a user selection of a link or uniform resource locator (URL), a web application requests a web document (e.g., an HTML document) including action items associated with rendering digital content referenced by the web document.

Upon receiving the web document, the dynamic content rendering system can analyze the action items to identify those action items corresponding to dynamic digital content. For example, the dynamic content rendering system can analyze the action items to identify any action items that replace default digital content with dynamic digital content within a visual element. In this manner, the dynamic content rendering system can identify any dynamic visual elements within the webpage that correspond to dynamic digital content.

In addition, the dynamic content rendering system can also identify any digital content that depends from external resources. For example, the dynamic content rendering system can identify action items that dependent on dynamic digital content stored at external resources and pre-fetch the dynamic digital content from the external resources. In one or more embodiments, the dynamic content rendering system pre-fetches the dynamic digital content by sending a request prior to performing action items for rendering the webpage.

As mentioned above, in one or more embodiments, the dynamic content rendering system also generates a dependency graph. For example, the dynamic content rendering system can identify independent action items that do not depend from other action items and identify dependent action items that depend from other action items. In one or more embodiments, the dynamic content rendering system generates a dependency graph including a map of the identified dependencies. For example, the dynamic content rendering system can generate a dependency tree that reflects dependencies between action items.

Upon generating the dependency graph, the dynamic content rendering system can generate an action queue based on the dependency graph. For example, in one or more embodiments, the dynamic content rendering system initiates the action queue by adding a subset of action items from the dependency graph. To illustrate, the dynamic content rendering system can identify independent action items from the dependency graph and add the independent items to the action queue.

In addition to generating the dependency graph and/or action queue, the dynamic content rendering system can also selectively hide visual elements of a webpage display. For example, upon identifying dynamic visual elements, the dynamic content rendering system can hide the dynamic visual elements prior to applying action items to render the webpage. To illustrate, in one or more embodiments, the dynamic content rendering system utilizes a document object model ("DOM") to render a webpage from a web document. The dynamic content rendering system can modify visual parameters of dynamic visual elements within the DOM to prevent the dynamic visual elements from being displayed on the webpage. In this manner, the dynamic content rendering system can apply action items to visual elements without inadvertently displaying default digital content that cause flicker.

Furthermore, in one or more embodiments, the dynamic content rendering system then applies each of the action items from the action queue. For example, the dynamic content rendering system can apply independent action items from the action queue to begin rendering the webpage and to clear the way for performance of other action items. In one or more embodiments, the dynamic content rendering system performs the independent action items from the action queue in parallel to further increase loading speed.

As mentioned above, in one or more embodiments, the dynamic content rendering system applies action items to a DOM in rendering a webpage. Specifically, the dynamic content rendering system can dynamically poll the DOM to identify visual elements that have been loaded. In one or more embodiments, upon determining that visual elements have been loaded into the DOM, the dynamic content rendering system applies independent action items from the action queue applicable to the loaded visual elements.

In addition, as the dynamic content rendering system applies action items from the action queue, the dynamic content rendering system can modify (e.g., update) the action queue. For example, in one or more embodiments, the dynamic content rendering system identifies other action items from the web document that become independent (e.g., as a result of applying independent action items) and adds the additional action items to the action queue.

In one or more embodiments, the dynamic content rendering system also reveals (e.g., unhides) dynamic visual elements and provides the dynamic visual elements for display. Indeed, the dynamic content rendering system can determine when action items from the dependency graph corresponding to dynamic visual elements have been performed. In response, the dynamic content rendering system can reveal the dynamic visual element and provide the dynamic visual element for display. To illustrate, the dynamic content rendering system can modify visual parameters of the dynamic visual element within the DOM and utilize the DOM to render the dynamic visual element within the webpage.

The dynamic content rendering system provides a number of advantages over conventional web content delivery systems. For example, by generating the dependency graph and implementing action items in accordance with the dependency graph, the dynamic content rendering system can optimize implementation of action items from a web document thereby reducing load times and flicker. Indeed, in contrast to brute force methods that sequentially perform action items listed in a web document, by generating and utilizing an action queue based on a dependency graph, the dynamic content rendering system can intelligently perform action items that are ready for implementation (e.g., independent action items) and avoid waiting for dependencies to resolve between the plurality of action items from the web document. In this way, the dynamic content rendering system can efficiently implement action items based on an identified sequence of the action queue, causing the webpage display to load faster and reduce flicker.

Moreover, the dynamic content rendering system can further reduce flicker by selectively hiding (and revealing) visual elements associated with dynamic digital content. In particular, by selectively hiding dynamic visual elements until dynamic digital content is ready for display, the dynamic content rendering system prevents inadvertent display of default digital content that will eventually be modified by action items associated with dynamic digital content. In this way, the dynamic content rendering system can prevent disruptive, jolting display of default digital content.

Moreover, in pre-processing the web document, the dynamic content rendering system can identify and pre-fetch digital content from external resources. In particular, by pre-fetching digital content, the dynamic content rendering system reduces flicker caused by waiting for dynamic digital content from one or more external sources. In addition, the dynamic content rendering system can reduce overall load time in rendering a web page.

Furthermore, utilizing the various approaches described above, the dynamic content rendering system can improve viewer retention. Indeed, the dynamic content rendering system can reduce (or eliminate) mis-impressions or conflicting information provided to viewers between default digital content and dynamic digital content. Moreover, the dynamic content rendering system can reduce (or eliminate) erroneous clicks on default digital content. Furthermore, the dynamic content rendering system can improve load times and provide individual visual elements as they become available. Accordingly, the dynamic content rendering system can reduce the number of viewers that abandon webpages as a result of flicker, delay, misinformation, and/or erroneous selections.

As illustrated by the foregoing discussion, the present disclosure utilizes a variety of terms to describe features and advantages of the dynamic content rendering system. Additional detail is now provided regarding the meaning of such terms. For instance, as used herein, a "web document" refers to a digital item including instructions for rendering a webpage. In particular, the term "web document" includes a digital document, file, or text that enable an application (e.g., web application) on a client device to render a webpage. In one or more embodiments described herein, a web document refers to a hypertext markup language (HTML) document.

As mentioned above, a web document can include any number of "actions items." As used herein, the term "action items" refers to discrete objects or data structures corresponding to a web document that include instructions for rendering a webpage. In particular, the term "action items" includes digital items within a web document, where the digital items include actions, selectors, content and/or instructions for rendering digital content within a webpage. For example, an action item may include an action for rendering a digital image within a header or other visual element of a webpage. In one or more embodiments, the action items refer to JavaScript Object Notation (JSON) objects included within a web document.

As mentioned above, the dynamic content rendering system can utilize a web document to load elements within a DOM and then utilize a DOM to render a webpage. As used herein, the term "document object model" or "DOM" refers to an object-oriented representation of a web document. In particular, a DOM includes a digital representation of a web document utilized to render a webpage. For example, a DOM can include a digital interface between JavaScript and a web document that allows for creation of dynamic webpages. For instance, the dynamic content rendering system can utilize a DOM to load elements (e.g., visual elements) referenced in a web document. The dynamic content rendering system can then modify the elements loaded into the DOM (e.g., replace default digital content with dynamic digital content and render dynamic visual elements) and render the web page with the modified elements. For instance, the dynamic content rendering system can utilize a DOM to add, change, and/or remove visual elements and attributes, change CSS styles, and/or create new events and then render a webpage.

As used herein, a "webpage" refers to a rendering of a web document. In particular, the term "webpage" includes a digital visual representation of a web document generated from a DOM. A webpage includes a digital visual representation of a web document provided for display via a display device. A webpage also includes a digital visual representation of a webpage from a DOM stored within memory of a computing device. In particular, a webpage can include an active view of a portion of a webpage as presented within a graphical user interface of a client device (and/or an inactive view or a portion of webpage stored within memory that is ready for display when a user scrolls to the inactive view).

As described above, a webpage and/or DOM can include "visual elements" identified in a web document. As used herein, the term "visual elements" refers to discrete portions (e.g., interface elements) of a webpage and/or DOM. In particular, the term "visual elements" includes discrete portions of webpage that provide digital content for display (as well as corresponding portions in a DOM). Thus, a web document can include a reference to a visual element, the dynamic content rendering system can generate a visual element as an object in the DOM from the web document, and the dynamic content rendering system can render the visual element as part of a webpage. Visual elements can portray dynamic digital content and/or default digital content. By way of example, a visual element can include a header, footer, column, text block, digital image element, digital text element, and/or digital video element. Moreover, visual elements of a webpage can portray digital content such as one or more digital images, digital videos, digital text, selectable icons, buttons, or other graphical elements. The term "dynamic visual element" refers to a visual element utilized to display dynamic digital content. The term "default visual element" refers to a visual element utilized to display default digital content.

As used herein, "digital content" refers to an electronic item. In particular, the term "digital content" includes an electronic item utilized to render a web page. More specifically, digital content includes an electronic item provided for display within a webpage. As described in greater detail below, digital content can include electronic data stored at a remote server that a computing device downloads to render a webpage (e.g., a digital image downloaded for display within a visual element of a webpage). As mentioned above, digital content can refer to digital images, digital videos, digital text, styles (e.g., CSS styles), buttons, graphical elements, and other types of digital content rendered within a webpage. Digital content can refer interchangeably to default digital content and/or dynamic digital content.

As used herein, "default digital content" refers to digital content originally and/or initially identified for a website. In particular, default digital content includes digital content utilized in a webpage without information regarding a viewer and/or device requesting a web document (and/or displaying/viewing a web page). For example, default digital content includes digital content associated with a webpage that is replaced by digital content based on characteristics of a user and/or device. Similarly, default digital content includes initial digital content associated with a webpage that is not revised or replaced.

As used herein, "dynamic digital content" refers to digital content that replaces default digital content. In particular, "dynamic digital content" includes digital content for a webpage that is selected based on information regarding a viewer and/or device requesting a web document. For instance, "dynamic digital content" includes targeted digital content selected based on particular characteristics of a viewer. In one or more embodiments, dynamic digital content refers to digital content that is changed, replaced, or otherwise provided in place of default digital content.

Figure 1A:
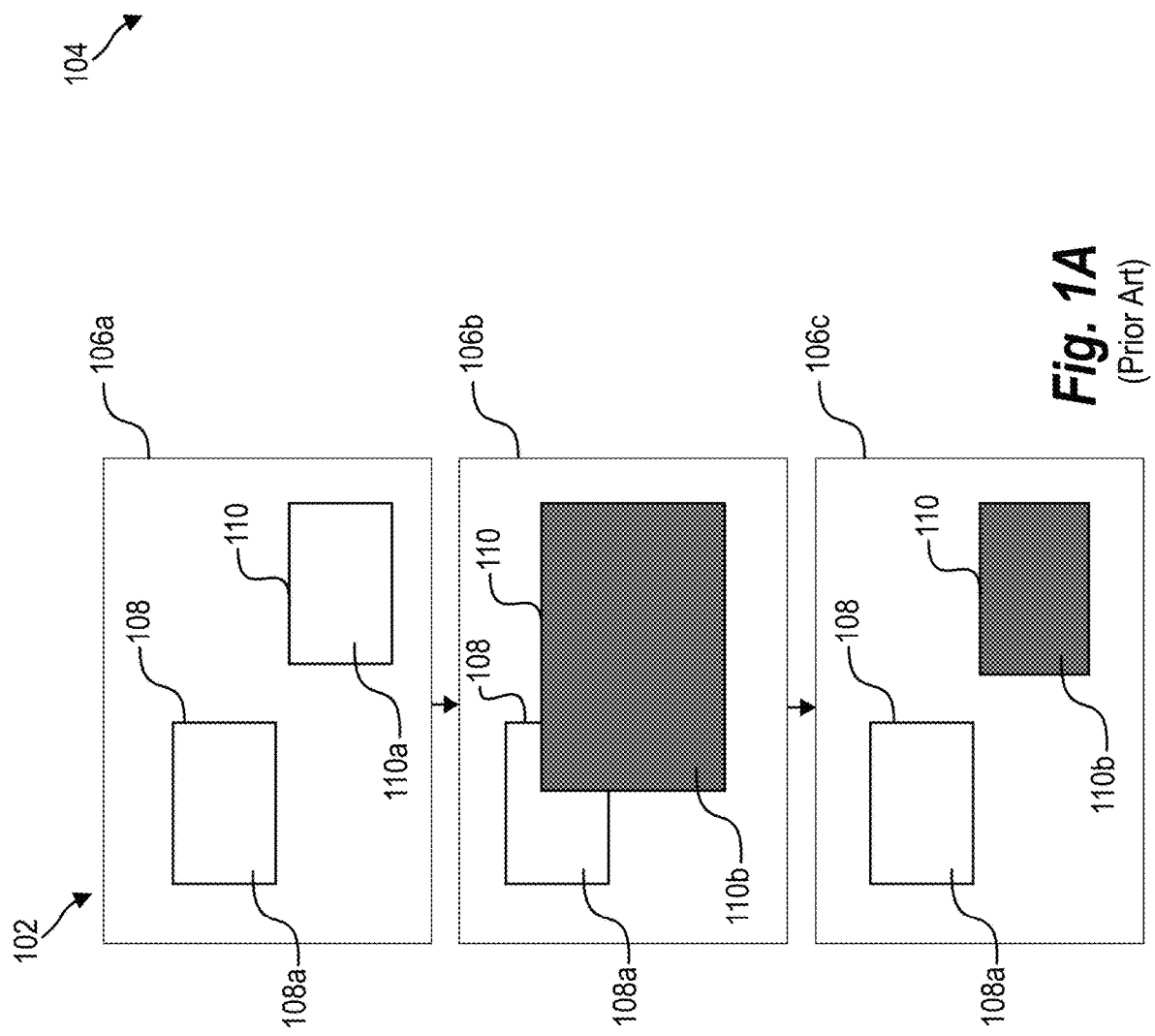
FIG. 1A illustrates a webpage in which dynamic digital content is provided in accordance with one or more conventional systems.

As mentioned above, in one or more embodiments, the dynamic content rendering system improves efficiency and speed of rendering a webpage while reducing flicker. For example, FIGS. 1A-1B illustrate contrasting examples in which dynamic digital content is provided via a webpage utilizing conventional systems and the dynamic content rendering system. In particular, FIG. 1A illustrates an example workflow 102 in which dynamic digital content replaces default digital content as performed by various conventional methods resulting in flicker of a webpage. In contrast, FIG. 1B illustrates an optimized workflow 104 in which the dynamic content rendering system reduces or otherwise eliminates flicker by rendering dynamic digital content via a webpage in accordance with one or more embodiments described herein.

In particular, FIG. 1A illustrates an example workflow 102 for loading and rendering a dynamic webpage based on a received web document (i.e., an HTML document that includes instructions for displaying dynamic digital content via visual elements of the webpage). As shown in FIG. 1A, the workflow 102 includes a first view 106a, a second view 106b, and a third view 106c showing different stages of rendering digital content via a graphical user interface of a client device. Specifically, the first view 106a, the second view 106b, and the third view 106c result from a brute force approach that sequentially applies action items listed in a web document.

In particular, the first view 106a includes a first visual element 108 (with a default digital content item 108a) and a second visual element 110 (with a second default digital content item 110a) rendered in accordance with instructions of the web document. Specifically, the web document includes action items to provide the first default digital content item 108a within the first visual element 108 and provide the second default digital content item 110a within the second visual element 110. The web document also includes subsequent action items to replace the second default digital content item 110a with a dynamic digital content item 110b (e.g., to provide targeted digital content to the user in response to detecting particular user characteristics).

Accordingly, as shown in FIG. 1A, the second view 106b illustrates the webpage in which the second default digital content item 110a is replaced by the dynamic digital content item 110b within the visual element 110. Specifically, the dynamic digital content item 110b is requested and inserted into the visual element 110 of the webpage upon receipt (e.g., prior to further actions for resizing or formatting the dynamic digital content). Accordingly, as shown in FIG. 1A, the second view 106b illustrates a flicker effect. In particular, the dynamic digital content item 110b creates a flicker by replacing the second default digital content item 110a. The dynamic digital content item 110b also covers a larger portion of the graphical user interface than the second default digital content item 110a, making the flicker effect even more apparent. As mentioned above, this causes a jarring and unpleasant experience for a viewer of the webpage.

The first view 106a and the second view 106b also illustrate how errant selections and frustration result from flicker caused by conventional systems. Indeed, if a user attempts to interact with the second default digital content item 110a, and the second default digital content item 110a is then replaced by the dynamic digital content item 110b, the user can erroneously select the dynamic digital content item 110b. In addition, where a user attempts to interact with the first default digital content item 108a, the flicker may cause the user to inadvertently click the dynamic digital content item 110b.

Moreover, in circumstances where the user sees the second default digital content item 110a and seeks to click the second default digital content item 110a, conventional systems remove the user's desired option. Specifically, conventional systems remove the second default digital content item 110a that the user seeks to interact with, resulting in additional user frustration and irritation.

Flicker can further result from additional sequential modifications to dynamic digital content as a webpage is loaded. For example, the web document can further include an action to resize or modify the dynamic digital content item 110b within the visual element 110 of the webpage. Accordingly, as illustrated in FIG. 1A, the workflow 102 proceeds to a third view 106c including a resized version of the dynamic digital content item 110b in place of the second default digital content item 110a from the first view 106a. As shown in the third view 106c, the larger size of the dynamic digital content item 110b is resolved by resizing the dynamic digital content item 110b (and/or the visual element 110) in accordance with instructions of the web document. Accordingly, a viewer of the webpage is exposed to another flicker (e.g., disorienting modification to the elements of a webpage) as a result of resizing the dynamic digital content between the second view 106b and the third view 106c.

In contrast, FIG. 1B illustrates an optimized workflow 104 implemented by one or more embodiments of the dynamic content rendering system described herein. Indeed, as mentioned above, the dynamic content rendering system can pre-process the web document to identify action items corresponding to dynamic digital content and/or dynamic visual elements and generate a dependency graph. Moreover, the dynamic content rendering system can determine dependencies between actions in the web document (including independent and dependent actions). The dynamic content rendering system can then generate an action queue from the dependency graph and perform actions from the action queue. Accordingly, the dynamic content rendering system can identify dynamic digital content, pre-fetch the dynamic digital content, and hide dynamic visual elements that depend on dynamic digital content. Furthermore, the dynamic content rendering system can efficiently perform action items in relation to the dynamic visual element based on the dependency graph and reveal the dynamic visual elements upon completion.

For example, FIG. 1B illustrates a first view 114a including a default digital content item 116a of a visual element 116 and a dynamic visual element 118 generated by the dynamic content rendering system. In particular, based on the pre-processing analysis, the dynamic content rendering system determines that the default digital content item 116 is to remain unchanged. Accordingly, the dynamic content rendering system performs action items to render the default digital content item 116a of the visual element 116 within the webpage in accordance with a corresponding action item from the web document.

In contrast, the dynamic content rendering system determines, based on the pre-processing analysis, that the dynamic visual element 118 is associated with dynamic digital content to be rendered via the webpage. In response to determining that the dynamic visual element 118 is associated with dynamic digital content, the dynamic content rendering system hides the dynamic visual element 118. Specifically, the dynamic content rendering system modifies visibility parameters of the dynamic visual element 118 within a DOM utilized to render the webpage such that the dynamic visual element 118 and digital content corresponding to the dynamic visual element 118 is not displayed in the webpage. Accordingly, where the web document references a default digital content item for the dynamic visual element 118 that will be replaced by dynamic digital content, the dynamic content rendering system prevents display of the default digital content item within the webpage.

In relation to FIG. 1B, while the dynamic visual element 118 is hidden, the dynamic content rendering system performs action items from an action queue based on a dependency graph. In particular, the dynamic content rendering system performs independent actions, updates the action queue, and then performs additional independent actions. Upon determining that all actions for a particular visual element are complete, the dynamic content rendering system reveals the visual element and provides the visual element for display with the webpage. Accordingly, by utilizing a dependency graph, the dynamic content rendering system can efficiently perform actions and display visual elements (without flicker).

Thus, as shown in FIG. 1B, the optimized workflow 104 proceeds to the second view 114b including the default visual element 116 with the default digital content item 116a and the dynamic visual element 118 with the dynamic digital content item 118b. As shown in FIG. 1B, the dynamic content rendering system avoids flicker by hiding the dynamic visual element 118 prior to performing action items for rendering the dynamic digital content item 118b shown in the second view 114b. Upon performing action items from the dependency graph applicable to the dynamic digital content item 118a, the dynamic content rendering system reveals the dynamic visual element 118 and provides the dynamic visual element 118 with the dynamic digital content item 118b for display. Thus, the dynamic content rendering system efficiently displays the dynamic digital content item 118b by utilizing a dependency graph to perform action items and surface the resulting visual element upon completion (e.g., with the proper, desired user experience).

Figure 2:
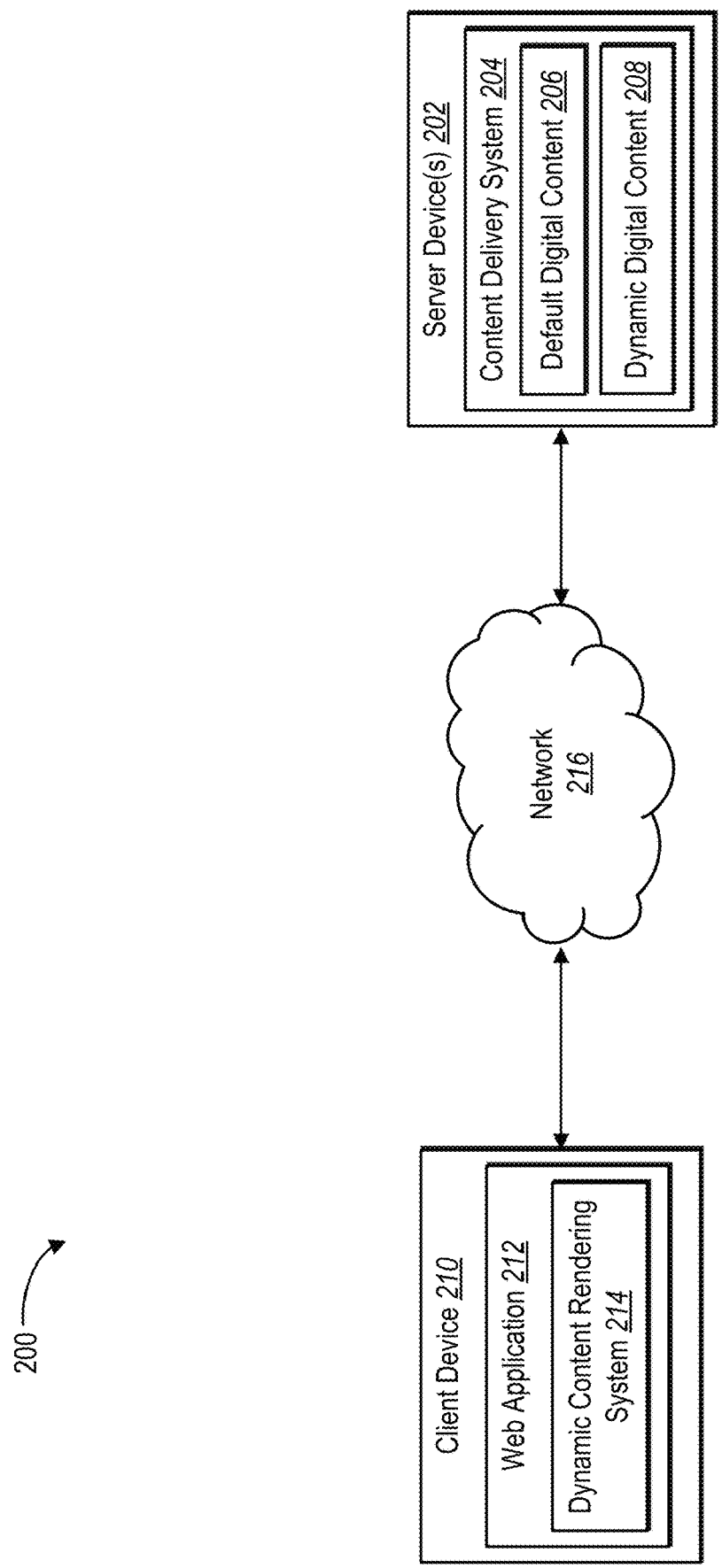
FIG. 2 illustrates a block diagram of an environment in which a dynamic content rendering system is implemented in accordance with one or more embodiments.

Additional detail will now be provided regarding the dynamic content rendering system in relation to illustrative figures portraying exemplary embodiments. For example, FIG. 2 illustrates a block diagram of an example environment 200 for providing dynamic digital content without flicker in accordance with one or more embodiments. As illustrated in FIG. 2, the environment 200 includes a server device(s) 202 including a content delivery system 204. The content delivery system 204 includes default digital content 206 and dynamic digital content 208. The environment 200 further includes a client device 210, which includes a web application 212. As further shown, the web application 212 includes a dynamic content rendering system 214. As shown in FIG. 2, the dynamic content rendering system 214 is implemented entirely on the client device 210. Nevertheless, in one or more embodiments, the dynamic content rendering system 214 is implemented in whole (or in part) on the server device(s) 202.

In one or more embodiments, the content delivery system 204, the default digital content 206, and the dynamic digital content 208 are located on different devices. For example, the default digital content 206 and dynamic digital content 208 may be located on one or more third-party server devices. Nonetheless, for the sake of explanation, FIG. 2 illustrates the content delivery system 204, default digital content 206, and dynamic digital content 208 are implemented on the server device(s) 202.

As shown in FIG. 2, each of the server device(s) 202 and client device 210 can communicate over a network 216. The network 216 may include one or multiple networks and may use one or more communication platforms or technologies suitable for transmitting data. In one or more embodiments, the network 216 includes the Internet or World Wide Web.

In addition, or as an alternative, the network 216 can include various other types of networks that use various communication technologies and protocols.

Although FIG. 2 illustrates a particular number and arrangement of the server device(s) 202 and client device 210, it will be understood that the environment 200 can include any number of devices, including any number of server devices 202 and client devices 210. Moreover, one or more of the devices may directly communicate via an alternative communication network, bypassing the network 216.

In addition, the client device 210 may refer to various types of computing devices. For example, one or more of the devices may include a mobile device such as a mobile telephone, a smartphone, a PDA, a tablet, or a laptop. Additionally, or alternatively, one or more of the devices may include a non-mobile device such as a desktop computer, a server, or another type of computing device. Additional detail with regard to different types of computing devices is described in reference to FIG. 10.

In relation to FIG. 2, the environment 200 facilitates delivery of digital content (e.g., web content) including default digital content 206 and dynamic digital content 208 to a user of the client device 210. In particular, in response to detecting a user selection of a link to a website, the content delivery system 204 can provide a web document to the client device 210 that enables the dynamic content rendering system 214 to provide a webpage via a graphical user interface on the client device 210. For example, in one or more embodiments, the content delivery system 204 provides an HTML document in response to detecting a user selection of a URL, refresh button, or other input for requesting web content from a web server. As will be described in further detail below, the web document can include any number of action items that facilitate loading and rendering digital content in a webpage via a graphical user interface of the client device 210.

In response to receiving the web document, the dynamic content rendering system 214 performs a series of acts to facilitate loading and rendering a webpage via a graphical user interface of the client device 210. For example, the dynamic content rendering system 214 can analyze action items of the web document (e.g., pre-process the action items prior to performing action items) to identify any action items that depend from external digital content (e.g., default digital content 206 and/or dynamic digital content 208). In one or more embodiments, the dynamic content rendering system 214 pre-fetches the external digital content by sending a request to the server device(s) 202 for default digital content 206 and dynamic digital content 208.

In addition, the dynamic content rendering system 214 further pre-processes action items of the web document to identify action items that correspond to dynamic digital content (e.g., the dynamic content rendering system 214 identifies dynamic visual elements). Moreover, in response to identifying dynamic visual elements from the web document (e.g., action items corresponding to dynamic digital content), the dynamic content rendering system 214 selectively hides the dynamic visual elements.

Moreover, the dynamic content rendering system 214 generates a dependency graph based on identified dependencies between the plurality of action items. Furthermore, the dynamic content rendering system 214 performs the action items based on the identified dependencies of the dependency graph (i.e., utilizing an action queue). Generating the dependency graph and performing action items based on the dependency graph enables the dynamic content rendering system 214 to more efficiently retrieve and load digital content while reducing flicker.

For instance, in relation to default visual elements and default digital content 206, the dynamic content rendering system 214 can perform action items in accordance with the dependency graph and efficiently render the default digital content 206 to the webpage immediately upon receipt. With regard dynamic visual elements, as the client device 210 receives the dynamic digital content 208, the dynamic content rendering system 214 performs the associated action items in accordance with the dependency graph (while the corresponding visual element is hidden within the DOM). Upon performing all action items for a dynamic visual element (e.g., action items from the dependency graph for replacing default digital content with dynamic digital content) the dynamic content rendering system 214 reveals and renders the dynamic digital content 208 with corresponding visual elements.

Figure 3:
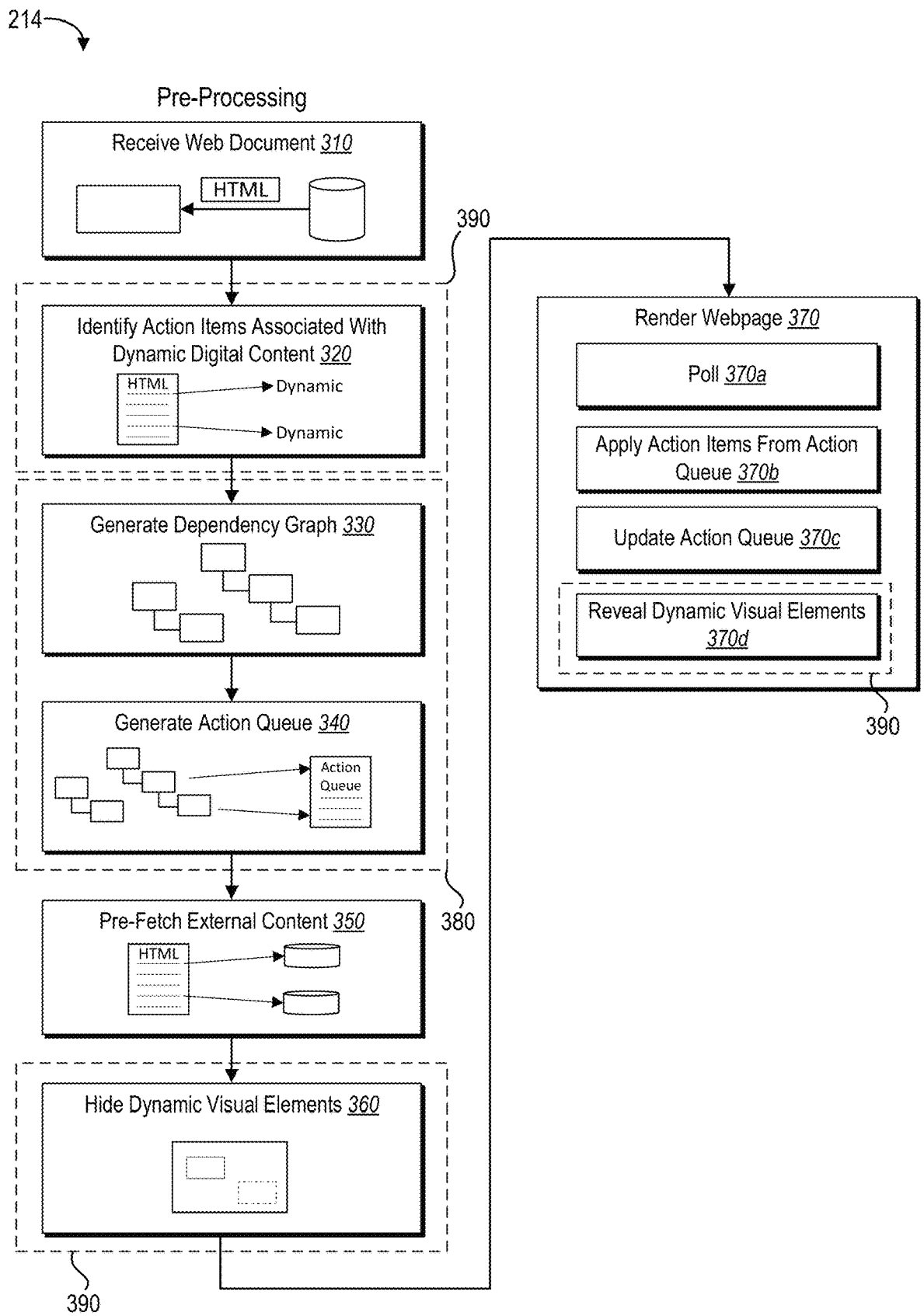
FIG. 3 illustrates an example workflow for providing dynamic digital content via a webpage in accordance with one or more embodiments.

Turning now to FIG. 3, additional detail will be provided regarding rendering a web page in accordance with one or more embodiments of the dynamic content rendering system 214. In particular, FIG. 3 illustrates acts 310-370 performed by the dynamic content rendering system 214 to provide dynamic digital content via a webpage without flicker. As further shown in FIG. 3, an act 370 for rendering a webpage further includes acts 370*a*-*d* that facilitate rendering the webpage.

In one or more embodiments, one or more acts 310-370, 370*a*-*d* can comprise a corresponding structure for steps related to providing dynamic digital content via a webpage without flicker. For example, as indicated in FIG. 3, the acts 330-340 comprise structure for a step 380 for generating an action queue from dependencies between the plurality of action items. As another example, as shown in FIG. 3, the acts 320, 360, and 370*d* comprise structure for a step 390 for revealing a dynamic visual element of the web document without displaying default digital content of the dynamic visual element.

As shown in FIG. 3, the dynamic content rendering system 214 performs an act 310 of receiving a web document. In one or more embodiments, the web document includes action items associated with rendering digital content via a webpage. As an example, the dynamic content rendering system 214 can receive an HTML document including a plurality of JSON objects including instructions (e.g., actions, selectors such as JQuery/Sizzle selectors to identify a visual element, content such as digital content stored on remote servers or within browser cache) for rendering a webpage. For instance, action items can include actions and associated instructions including references to elements of a webpage (e.g., header, footer, body, etc.), content to include within a visual element, behavior associated with selecting the element, and other data that the dynamic content rendering system 214 can utilize in rendering digital content via a webpage.

In one or more embodiments, the dynamic content rendering system 214 receives the web document from a web server. For example, in one or more embodiments, the dynamic content rendering system 214 requests the web document from the server device(s) 202 based on detecting a user selection of a link or URL and receives the web document from the server device(s) 202. Alternatively, in one or more embodiments, the dynamic content rendering system 214 requests and/or receives the web document from a third-party server device(s) independent from the server device(s) 102 and associated with a selected link or URL.

As mentioned above, in one or more embodiments, the dynamic content rendering system 214 pre-processes a web document prior to performing action items to identify dynamic visual elements, pre-fetch external digital content, and/or generate a dependency graph. For example, as shown in FIG. 3, upon receiving the web document, the dynamic content rendering system 214 can perform the act 320 of identifying action items associated with dynamic digital content (i.e., identifying dynamic visual elements). For example, in one or more embodiments, the dynamic content rendering system 214 runs a loop through the action items in the web document and identifies any action items that reference dynamic digital content to be rendered via a webpage display. The dynamic content rendering system 214 can also identify action items that relate to dynamic digital content (e.g., action items that act as pre-requisites to adding dynamic digital content or action items that depend from action items for adding dynamic digital content).

For instance, the dynamic content rendering system 214 can identify action items with instructions to modify a visual element based on characteristics of a client device 210 and/or user of the client device 210. By way of example and not limitation, examples of action items associated with providing dynamic digital content include removing default digital content, adding dynamic digital content, modifying an attribute or behavior of a dynamic visual element, modifying a style of a dynamic visual element, rearranging digital content, resizing digital content, adding custom code, adding text, and/or replacing default digital content with personalized content.

In one or more embodiments, the act 320 can also include identifying external digital content. For example, the act 320 can include identifying external content that the dynamic content rendering system 214 needs to fetch from external sources (e.g., a remote server) prior to performing one or more action items. To illustrate, the act 320 can include identifying dynamic digital content that the dynamic content rendering system 214 needs to obtain prior to performing one or more action items for a dynamic visual element.

As shown in FIG. 3, the dynamic content rendering system 214 additionally performs the act 330 of generating a dependency graph. In particular, upon receiving the web document, the dynamic content rendering system 214 analyzes the action items to identify dependencies between the action items. For example, the dynamic content rendering system 214 identifies independent action items and dependent action items as well as dependencies between the action items. The dynamic content rendering system 214 then generates a dependency graph that reflects the identified independencies and dependencies of the action items. In one or more embodiments, the dynamic content rendering system 214 generates a dependency graph including a dependency tree or other data structure that reflects the identified dependencies. Additional detail with respect to generating the dependency graph will be described in connection with FIGS. 4A-4B below.

As mentioned above, the dynamic content rendering system 214 can also utilize the dependency graph to generate an action queue. Indeed, as shown in FIG. 3, based on the dependency graph, the dynamic content rendering system 214 performs the act 340 of generating an action queue. In particular, the dynamic content rendering system 214 generates an action queue including action items ready for execution. For example, based on the dependency graph, the dynamic content rendering system 214 identifies independent action items and adds those identified independent action items to the action queue. Additional detail with respect to generating the action queue will be described in connection with FIGS. 4A-4B below.

As shown in FIG. 3, the dynamic content rendering system 214 can also perform the act 350 of pre-fetching external digital content. For example, in one or more embodiments, the dynamic content rendering system 214 analyzes the action items of the web document and identifies each of the action items that reference default digital content and/or dynamic digital content located on one or more external devices (e.g., server device(s) 102 or other third-party web server(s)). In addition, the dynamic content rendering system 214 can pre-fetch the external digital content by requesting the digital content referenced by the action items from the respective external sources.

In one or more embodiments, the dynamic content rendering system 214 pre-fetches dynamic digital content specifically (and does not pre-fetch default digital content). In particular, upon identifying action items associated with dynamic digital content (at the act 320), the dynamic content rendering system 214 pre-fetches the dynamic digital content corresponding to the identified action items.

In one or more embodiments, the dynamic content rendering system 214 pre-fetches external digital content by sending a request to any external sources prior to executing or otherwise implementing any of the action items. For example, in one or more embodiments, the dynamic content rendering system 214 pre-fetches digital content prior to executing any action items and/or rendering digital content via the webpage. In this way, the dynamic content rendering system 214 can have access to digital content corresponding to respective action items at a time when the dynamic content rendering system 214 executes the action items.

As shown in FIG. 3, the dynamic content rendering system 214 further performs an act 360 of hiding dynamic visual elements. In particular, upon identifying action items associated with dynamic digital content (at the act 320), the dynamic content rendering system 214 hides visual elements corresponding to the dynamic digital content. For example, the dynamic content rendering system 214 identifies and hides any visual elements of the web document associated with action items for providing dynamic digital content within visual elements of the webpage. For example, the dynamic content rendering system 214 can identify dynamic visual elements and modify visibility parameters in the DOM to prohibit display of the dynamic visual elements. In this way, the dynamic content rendering system 214 prevents inadvertent display of default digital content via a graphical user interface of the client device 210 and reduces or otherwise eliminates flicker caused as a result of modifying displayed default digital content after default digital content has been inadvertently displayed. Additional detail with respect to hiding visual elements will be described in connection with FIGS. 5A-5B below.

As illustrated in FIG. 3, in one or more embodiments, the acts 310-360 are performed as a part of pre-processing. In particular, all or a portion of the acts 310-360 can be performed prior to performing and/or executing instructions in the web document. For example, the dynamic content rendering system 214 can perform all or a portion of the acts 310-360 prior to performing action items in the web document, prior to rendering the webpage, and/or prior to providing any portion of the webpage for display.

As further shown in FIG. 3, after pre-processing, the dynamic content rendering system 214 also performs an act 370 of rendering the webpage. The act 370 can include rendering a digital visual representation of the webpage and providing the webpage for display via a display of a computing device. In particular, as shown in FIG. 3, the act 370 can include individual acts 370a-370d.

For example, in one or more embodiments, the dynamic content rendering system 214 performs the act 370a of polling. In particular, the dynamic content rendering system 214 can perform the act 370 by dynamically polling a DOM to identify visual elements that have been loaded into the DOM. As discussed above, the dynamic content rendering system 214 can render the webpage by a utilizing a DOM that acts as an interface between JavaScript and a web document that allows for creation of a dynamic webpage. The dynamic content rendering system 214 can thus periodically poll the DOM to determine what visual elements have been loaded into the DOM from the web document. Additional detail regarding polling the DOM is provided below in relation to FIGS. 5A-5B.

As shown, the act 370 of rendering the webpage can also include the act 370b of applying actions from the action queue (i.e., in accordance with the dependency graph). In particular, the dynamic content rendering system 214 can execute independent actions from the action queue. More specifically, the dynamic content rendering system 214 can identify visual elements loaded into the DOM (from the act 370a) and apply independent action items from the action queue to the identified visual elements loaded into the DOM. For example, the dynamic content rendering system 214 can render digital content by applying the action items, including actions, selectors (e.g., JQuery/Sizzle selectors to identify a visual element), and content (e.g., payload for an action, such as digital content stored at remote servers or within browser cache) to respective elements of the DOM. The dynamic content rendering system 214 can perform any number of action items in parallel (e.g., simultaneously). In this manner, the dynamic content rendering system can utilize the action queue (and dependency graph) to quickly and efficiently perform action items from the web document as soon as they are ready to be executed.

As illustrated in FIG. 3, the act 370 of rendering the web page also includes the act 370c of updating the action queue. In particular, the dynamic content rendering system 214 can determine when action items have been performed and update the action queue. For instance, the dynamic content rendering system 214 can update dependencies in the dependency graph and identify action items that are now independent. The dynamic content rendering system 214 can then add the now independent action items to the action queue.

As shown in FIG. 3, the dynamic content rendering system can repeat the acts 370a-370c. For instance, upon updating the action queue, the dynamic content rendering system 214 can poll the DOM to identify visual elements loaded into the DOM. The dynamic content rendering system 214 can apply action items from the action queue to the visual elements loaded into the DOM. The dynamic content rendering system can then update the action queue.

Furthermore, as shown in FIG. 3, the dynamic content rendering system 214 can also perform the act 370 of rendering the webpage by performing the act 370d of unhiding dynamic visual elements. In particular, as the dynamic content rendering system 214 receives dynamic digital content and as dynamic digital content becomes ready for display, the dynamic content rendering system 214 can selectively reveal dynamic visual elements and render the dynamic digital content on the webpage. Specifically, the dynamic content rendering system 214 can determine that it has performed all action items corresponding to a dynamic visual element. For instance, the dynamic content rendering system 214 can analyze a dependency graph and determine that no additional action items exist for a particular chain of related action items corresponding to a dynamic visual element. The dynamic content rendering system 214 can then reveal the dynamic visual element. For instance, the dynamic content rendering system 214 can modify visibility parameters for the dynamic visual element in the DOM and then utilize the DOM to render the dynamic visual element in the webpage and provide the webpage for display to the user.

The acts described in relation to FIG. 3 are intended to be illustrative of one or more acts in accordance with the present disclosure, and are not intended to limit potential embodiments. Alternative embodiments can include additional, fewer, or different acts than those articulated in FIG. 3. For instance, in some embodiments, the dynamic content rendering system 214 does not generate an action queue, but performs actions directly from a dependency graph (thus avoiding the act 340) and then updates the dependency graph.

Additionally, the acts described herein may be performed in a different order, may be repeated or performed in parallel with one another, or may be performed in parallel with different instances of the same or similar acts. For example, while the illustration in FIG. 3 shows the act 330 of generating a dependency graph prior to pre-fetching external content, in one or more embodiments, the dynamic content rendering system 214 pre-fetches external content prior to generating a dependency graph. Similarly, the dynamic content rendering system can perform the acts 330, 340, 350, and/or 360 in different orders or simultaneously (e.g., hide dynamic visual elements before generating a dependency graph or pre-fetch external content simultaneously with hiding dynamic visual elements).

Furthermore, although FIG. 3 illustrates the dynamic content rendering system 214 performing the act 360 of hiding dynamic visual elements in the pre-processing stage, the dynamic content rendering system 214 can hide dynamic visual elements at a variety of different times or in response to a variety of different events. For example, in one or more embodiments, the dynamic content rendering system 214 hides dynamic visual elements when the DOM is in a ready state and/or when the dynamic visual element is loaded into the DOM.

Figure 4A:
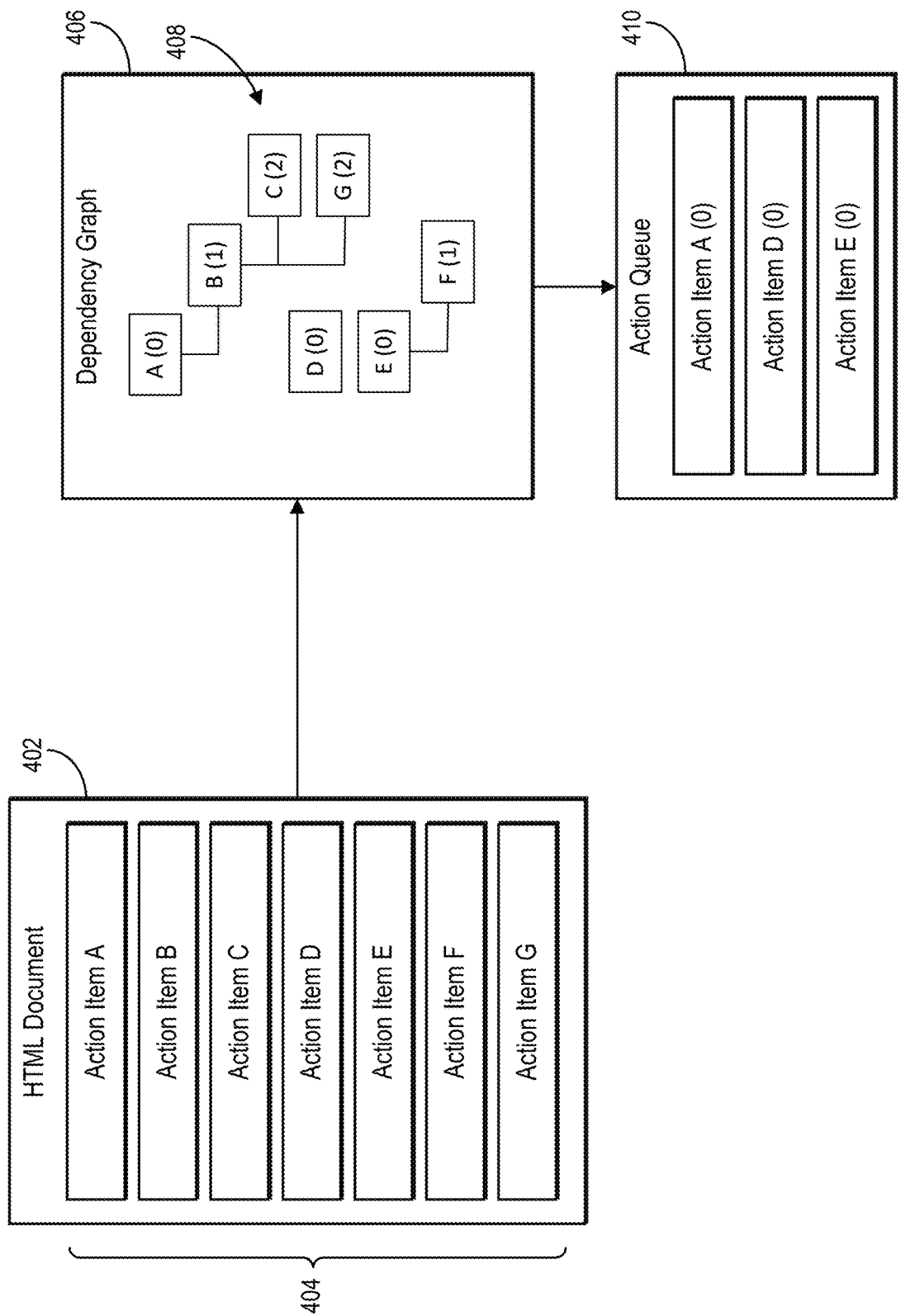
FIGS. 4A-4B illustrates managing a dependency graph and an action queue for providing digital content in accordance with one or more embodiments.
Figure 4B:
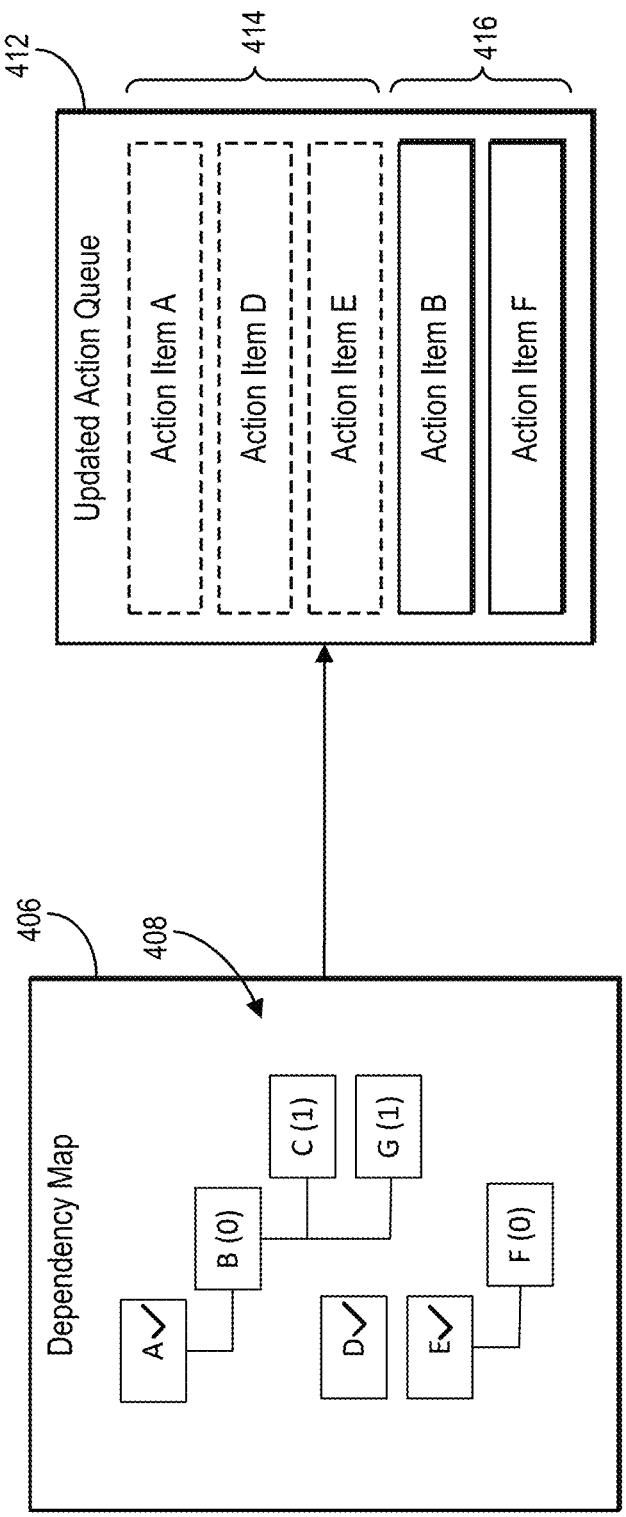

Turning now to FIGS. 4A-4B, additional detail will be provided regarding generating dependency graphs and/or action queues in accordance with one or more embodiments. In particular, FIG. 4A illustrates an example HTML document 402 (i.e., a web document) including action items 404, individually identified as action items A-G. Each of the action items 404 are associated with rendering a webpage (e.g., via the client device 210). More specifically, each of the action items 404 include instructions for rendering digital content within visual element of a webpage. Furthermore, many of the action items 404 are dependent on each other (e.g., a first action item must be performed before a second action item). Accordingly, as mentioned above, the dynamic content rendering system 214 analyzes the HTML document 402 to identify dependencies between the action items 404.

Specifically, as shown in FIG. 4A, the dynamic content rendering system 214 analyzes dependencies of the action items 404 in the HTML document 402 and generates a dependency graph 406. More particularly, the dynamic content rendering system 214 generates a dependency tree 408 that includes nodes associated with respective action items and edges that illustrate the identified dependencies.

As an alternative to the dependency tree 408, in one or more embodiments, the dynamic content rendering system 214 generates a dependency graph using an alternative type of data structure (e.g., an array, text description, etc.).

As mentioned above, the dynamic content rendering system 214 can determine independent action items and dependent actions. For instance, as shown in FIG. 4A, the dependency tree 408 shows nodes A-G corresponding to the individual action items A-G from the plurality of action items 404. In particular, the dynamic content rendering system 214 determines that action item A does not depend from any other action item. Therefore, the dynamic content rendering system 214 includes an independent node A that corresponds to the action item A in the dependency tree 408.

Similarly, the dynamic content rendering system 214 determines that action item B depends from action item A. Accordingly, the dynamic content rendering system 214 includes a node B corresponding to the action item B within the dependency tree. Furthermore, the dynamic content rendering system 214 determines that the action items C and G dependent from action item B and adds corresponding nodes within the dependency tree 408.

The dynamic content rendering system 214 continues this approach for the remaining nodes in the dependent tree 408. Specifically, the dynamic content rendering system 214 determines that the action item D does not depend from any other action item and adds a corresponding independent node D to the dependency tree 408. The dynamic content rendering system 214 further determines that action item E is independent and action item F is dependent on action item E. The dynamic content rendering system 214 therefore generates corresponding nodes in the dependency tree 408.

As further shown in FIG. 4A, the dependency graph 406 includes dependency scores associated with the individual action items A-G. In particular, the dependency graph 406 shows scores of "0" for each of nodes A, D, and E indicating that the corresponding action items A, D, and E do not depend from any other action items (i.e., the action items A, D, and E are independent). The dependency graph 406 further shows scores of "1" for nodes B and F indicating a single dependency of the corresponding action items B and F. The dependency graph 406 further shows scores of "2" for nodes C and G indicating multiple (2) dependencies of the corresponding action items C and G.

Based on the dependency graph 406, the dynamic content rendering system 214 generates an action queue 410 including action items that are ready to be implemented (e.g., without waiting on one or more other action items to resolve). For example, as shown in FIG. 4A, the action queue 410 includes action item A, action item D, and action item E based on identified independencies from the dependency graph 406. In particular, the dynamic content rendering system 214 generates the action queue 410 by adding any independent action items from the HTML document 402 based on the dependency graph 406.

Although FIG. 4 illustrates adding only independent action items to the action queue, the dynamic content rendering system 214 can add action items to the action queue utilizing other criteria. For example, the dynamic content rendering system 214 can add action items to the action queue in accordance with other dependency scores from the dependency graph 406. To illustrate, the dynamic content rendering system 214 can add action items to the action queue where the dependency score for the action item is 1 or less.

As mentioned above, the dynamic content rendering system can perform action items from an action queue. For instance, in relation to FIG. 4A, the dynamic content rendering system 214 applies the action items A, D, and E as corresponding visual elements become available in the DOM. Notably, the action items A, D, and E are not sequentially listed in the HTML document 402. Indeed, conventional brute force approaches implement the action items A-G as listed in the HTML document 402, without considering dependencies. This results in inefficiency and wasted time, as many of the action items A-G have multiple dependencies and cannot be performed until the dependencies resolve. In relation to FIG. 4A, however, the dynamic content rendering system 214 implements the action items from the action queue 410 by simultaneously applying the action items A, D, and E, each of which are ready for execution.

Furthermore, as mentioned above, as the dynamic content rendering system 214 performs action items from an action queue, the dynamic content rendering system 214 can update the action queue. For example, FIG. 4B illustrates updating the action queue 410 to reflect current independencies and dependencies of corresponding action items 404, in accordance with the dependency graph 406.

Specifically, as shown in FIG. 4B, the dynamic content rendering system 214 detects that the independent action items A, D, and E are complete. Accordingly, the dynamic content rendering system 214 updates the dependency map 406 and the action queue 410. Specifically, the dynamic content rendering system 214 identifies nodes A, D, and E on the dependency map as complete. The dynamic content rendering system 214 also changes the dependency scores for nodes B, C, G, and F based on identifying that action items A, D, and E are complete. Specifically, the dynamic content rendering system 214 modifies the dependency scores to indicate that action item B has "0" dependencies (i.e., action item B is independent), action item C has "1" dependency, action item G has "1" dependency, and action item F has "0" dependencies (i.e., action item F is independent).

In accordance with the dependency graph 406, the dynamic content rendering system 214 generates an updated action queue 412 that reflects the updated dependencies of the action items 404. In particular, the dynamic content rendering system 214 generates the updated action queue 412 by modifying the original action queue 410 to reflect completed action items and action items that have become independent as a result of completing the action items A, D, and E. For example, as shown in FIG. 4B, the updated action queue 412 shows completed action items 414 (i.e., action items A, D, and E) and additional independent action items 416 (i.e., action items B and F) added from the dependency graph 406.

In one or more embodiments, the dynamic content rendering system 214 generates the updated action queue 412 by removing the completed action items 414. Alternatively, the dynamic content rendering system 214 can mark the action items as completed without removing the completed action items 414 from the updated action queue 412. In addition, based on identifying that all of the original independent action items (as indicated by dependency scores of "0") have been completed, the dynamic content rendering system 214 can add new action items 416. Accordingly, as shown in FIG. 4B, the dynamic content rendering system 214 adds action items B and F to the action updated action queue based on dependency scores for corresponding nodes B and F from the dependency graph 406.

As mentioned, the dynamic content rendering system 214 can add action items to the action queue as the action items become independent. For example, upon executing instructions of action item A, the dynamic content rendering system 214 can determine that action item B has become independent and immediately add action item B to the end of the action queue 410. In one or more embodiments, the dynamic content rendering system 214 periodically cycles through the dependency graph and adds any action items that have become independent since a previous time that the dynamic content rendering system 214 analyzed the dependency graph 406.

Figure 5A:
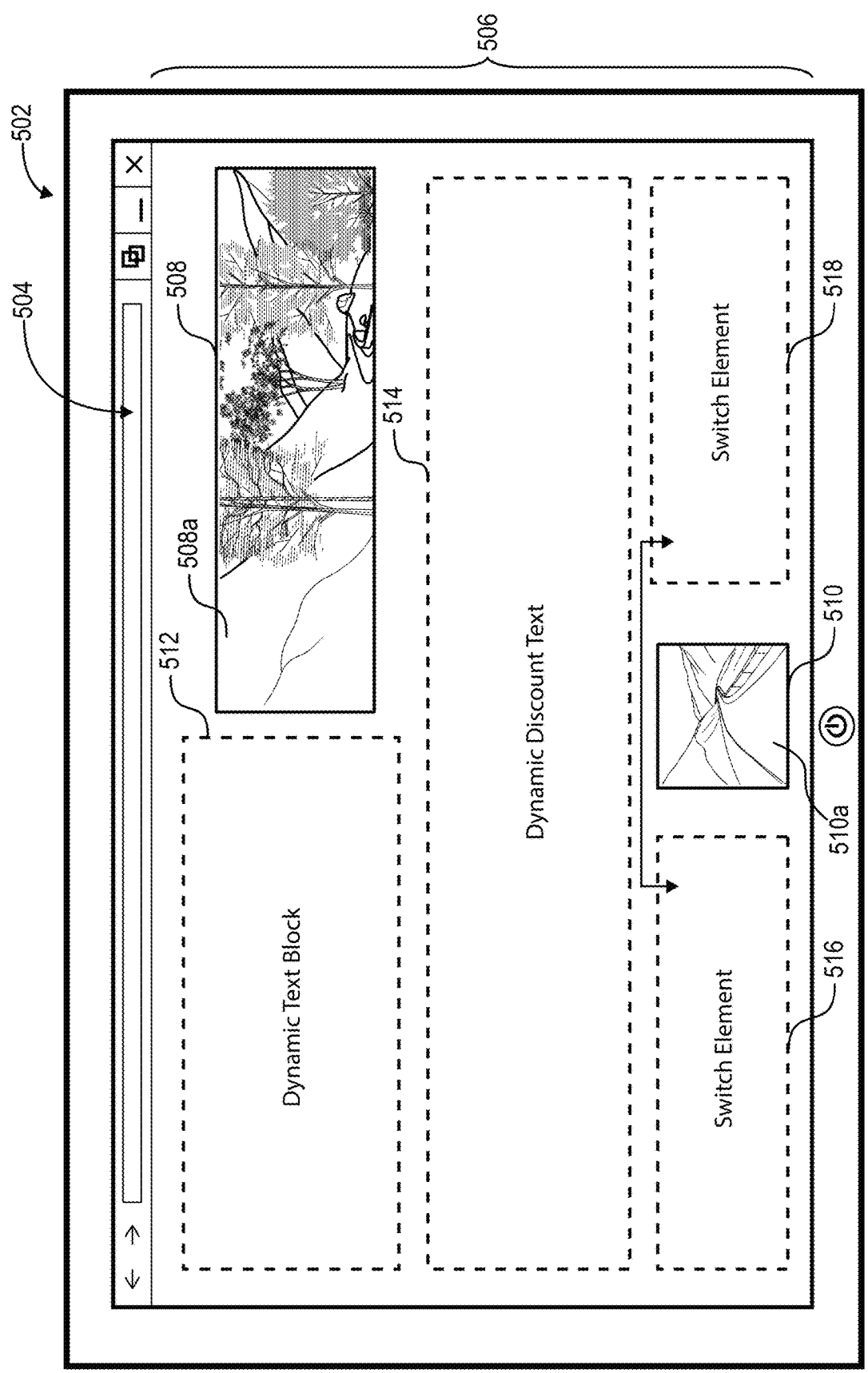
FIGS. 5A-5B illustrate selectively hiding and revealing dynamic visual elements in accordance with one or more embodiments.
Figure 5B:
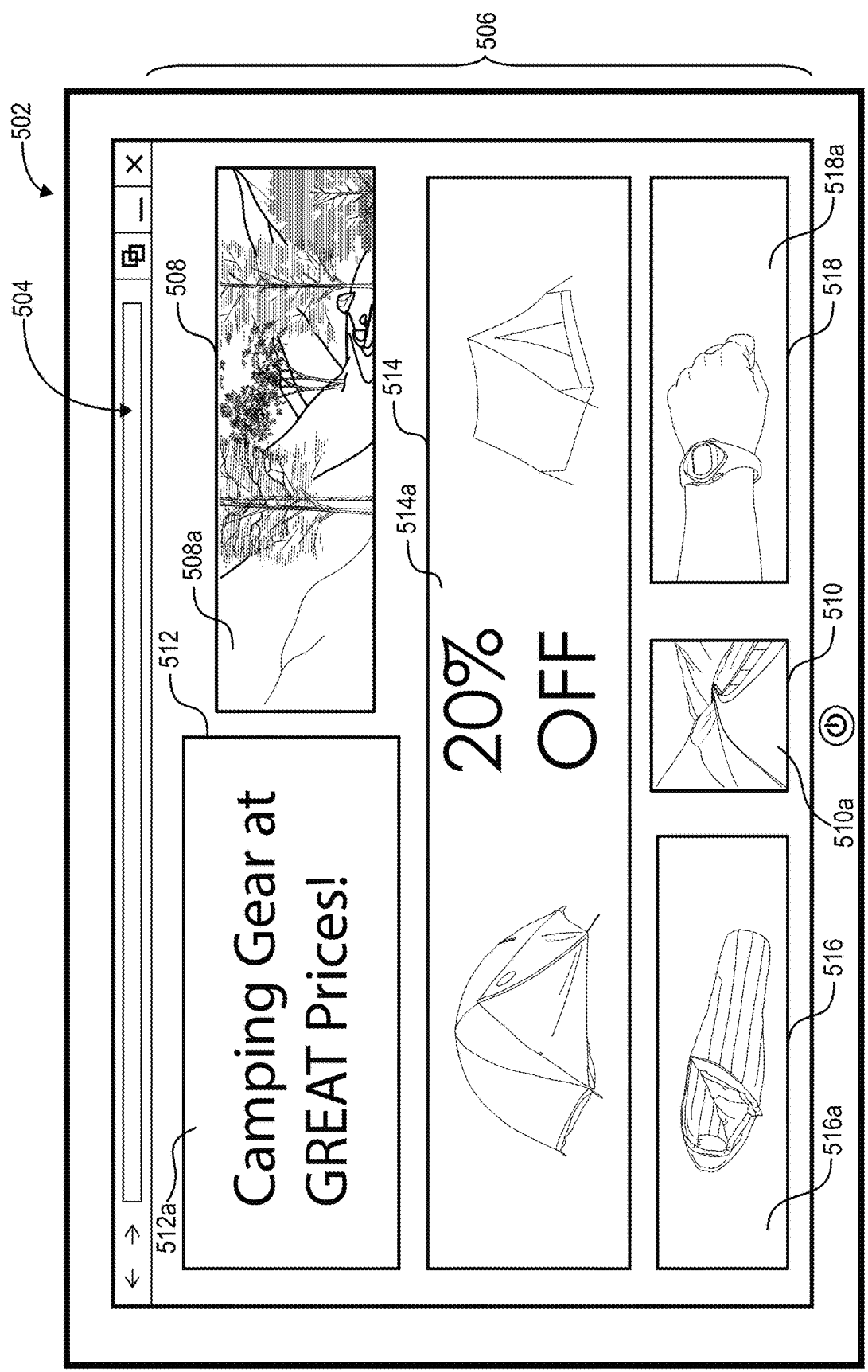

In addition to reducing flicker by rendering action items based on dependencies of the dependency graph, the dynamic content rendering system 214 can additionally reduce flicker by selectively hiding visual elements of a webpage display. For example, FIGS. 5A-5B illustrate an example embodiment in which the dynamic content rendering system 214 selectively hides visual elements of a webpage display based on a determination that the visual elements are associated with dynamic digital content. In particular, as mentioned above, the dynamic content rendering system 214 selectively hides visual elements based on identifying corresponding action items having selectors or other action item associated with rendering dynamic digital content within one or more visual elements of the webpage. In contrast, where a visual element is not associated with dynamic digital content (e.g., the visual element corresponds to an action item that does not reference dynamic digital content), the dynamic content rendering system 214 can render dynamic digital content therein without hiding the visual element.

For example, FIG. 5A illustrates an example computing device 502 including a graphical user interface 504 providing a webpage 506 in accordance with one or more embodiments. As shown in FIG. 5A, the webpage 506 includes a first default visual element 508 with a first default digital content item 508a and a second default visual element 510 with a second default digital content item 510a.

In particular, the dynamic content rendering system 214 provides the default digital content items 508a, 510a based on a determination that the visual elements 508, 510 have no association with dynamic digital content (e.g., the visual elements 508, 510 include default digital content). Accordingly, the dynamic content rendering system 214 renders the default digital content items 508a, 510a with the corresponding visual elements 508, 510 (e.g., without hiding the visual elements 508, 510 or waiting for receipt of dynamic digital content).

In contrast, the dynamic content rendering system 214 can identify dynamic visual elements 512-518 associated with corresponding dynamic digital content. In particular, in one or more embodiments, the dynamic content rendering system 214 analyzes the action items of the web document to identify action items that include instructions for rendering dynamic digital content via the webpage 506. For example, in one or more embodiments, the dynamic content rendering system 214 identifies any action items that require modification of digital content. Upon identifying the action items that reference dynamic digital content, the dynamic content rendering system 214 further identifies visual elements associated with the identified action items. For example, the dynamic content rendering system 214 can utilize the selector of dynamic action items to identify corresponding dynamic visual elements. In this manner, the dynamic content rendering system 214 identifies the dynamic visual elements 512-518 associated with action items that include instructions for rendering dynamic digital content.

As mentioned above, rendering dynamic digital content can include providing various types of dynamic digital content within the respective dynamic visual elements 512-518. For example, the dynamic content rendering system 214 can identify a dynamic block of text to include within a first dynamic visual element 512 (to replace default text associated with the first dynamic visual element 512). This may include text associated with a specific or type of products in which a user of the computing device 502 has an interest (e.g., based on a viewing history, purchase history, or other characteristic associated with the user of the computing device 502). Alternatively, the dynamic content rendering system 214 may identify text that differs based on the time of day, season of the year, or other factors.

As another example, the dynamic content rendering system 214 can identify dynamic discount text to render within a second visual element 514. For example, where a user has a history of responding favorably to discounts, the dynamic content rendering system 214 can provide a discount for a certain amount based on history of the user responding to certain discounts. In one or more embodiments, the dynamic content rendering system 214 may determine a different discount amount from a default amount offered to users having no purchase history. In this case, the dynamic content rendering system 214 may determine that an action item includes instructions for offering a different discount amount from a default amount, and associate the second dynamic visual element 514 with dynamic digital content.

As another example, in one or more embodiments, the dynamic content rendering system 214 may identify that one or more action items include instructions to switch a first digital content item with another digital content item. For instance, as shown in FIG. 5A, the dynamic content rendering system 214 determines that an action item will switch digital content originally intended for a third visual element 516 with digital content originally intended for a fourth visual element 518. Accordingly, even where digital content is not specifically selected for a user, the dynamic content rendering system 214 may identify the third visual element 516 and fourth visual element 518 as associated with dynamic digital content based on a change in the digital content items to be rendered within the respective visual elements 516, 518. Similar to one or more embodiments described herein, the dynamic content rendering system 214 can switch the digital content items based on past behavior of a user or other instructions for cycling positions of digital content items between consecutive visits to the associated webpage.

As mentioned above, the dynamic content rendering system 214 hides dynamic visual elements until the dynamic visual elements are ready for display. For instance, the dynamic content rendering system 214 can hide dynamic visual elements until the dynamic content rendering system 214 has received the dynamic visual element, the dynamic content rendering system 214 loads the visual element into the DOM, and/or the dynamic content rendering system 214 has applied pertinent action items the dynamic visual elements. For example, even where the dynamic content rendering system 214 has received default digital content for one or more of the dynamic visual elements 512-518, the dynamic content rendering system 214 can continue hiding the dynamic visual elements 512-518 by preventing displaying of the dynamic visual elements 512-518 via the webpage 506.

However, as shown in FIG. 5B, the dynamic content rendering system 214 reveals the dynamic visual elements 512-518 and provides the dynamic visual elements 512-518 with corresponding dynamic digital content 512a-518a for display via the webpage 506. In particular, the webpage 506 includes a first dynamic digital content item 512a (a block of text) rendered within the first dynamic visual element 512. As further shown, the webpage 506 includes a second dynamic digital content item 514a rendered within the second visual element 514 including an image of camping gear with a customized discount (20% off) displayed over the image. The webpage 506 further includes digital content items 516a, 518a rendered within the third and fourth visual elements 516, 518. The digital content items 516, 518 include digital content items that switched positions within the webpage 506 based on instructions of corresponding action items of the web document.

In relation to FIGS. 5A-5B, the dynamic content rendering system 214 reveals the dynamic visual elements 512-518 individually and provides the dynamic digital content items 512a-518a for display based on a determination that the dynamic digital content items 512a 518a were ready for display. For example, the dynamic content rendering system 214 reveals the dynamic visual element 512 based on a determination that the dynamic digital content 512 has been received, that the dynamic visual element 512 has been loaded into the DOM, and that all action items corresponding to the dynamic visual element 512 and/or the dynamic digital content has been performed.

As just mentioned, in one or more embodiments, the dynamic content rendering system 214 determines whether dynamic digital content has been received. If the dynamic digital content has been received, the dynamic content rendering system 214 can render the dynamic digital content within a respective visual element and discard or otherwise ignore associated default digital content. Alternatively, where dynamic digital content has yet to be received, the dynamic content rendering system 214 can continue hiding the dynamic visual elements until the dynamic digital content has been received and store the default digital content for later retrieval in case the dynamic content rendering system 214 does not receive the dynamic digital content.

As mentioned, in one or more embodiments, the dynamic content rendering system 214 hides a dynamic visual element until the dynamic visual element has loaded into the DOM. Accordingly, in one or more embodiments, the dynamic content rendering system 214 periodically polls the DOM to determine if the visual element has been loaded (e.g., rendered) into the DOM. For example, in one or more embodiments, the dynamic content rendering system 214 polls the DOM to determine at discrete polling cycles whether the dynamic visual element has been loaded since the previous polling cycle. If the dynamic visual element is loaded into the DOM, the dynamic content rendering system 214 can apply action items in accordance with the dependency graph and then reveal the dynamic visual element. Alternatively, if the dynamic visual element is not loaded, the dynamic content rendering system 214 can continue hiding the dynamic visual element and poll the DOM interface during the next polling cycle (e.g., every 50 milliseconds). In one or more embodiments, the dynamic content rendering system 214 can also reveal the dynamic visual element after a threshold number of polling cycles (or a threshold amount of time) has passed without loading the dynamic visual element in the DOM.

Figure 6:
FIG. 6 illustrates a table showing improved load times for providing digital content in accordance with one or more embodiments.

As mentioned above, the dynamic content rendering system 214 can reduce load times for individual elements of the webpage display as well as the total time for loading the webpage. In particular, researchers have conducted experiments to show reduction in load time resulting from the dynamic content rendering system 214. To illustrate, FIG. 6 shows a table 600 including calculated load times for dynamic elements of an example webpage utilizing a conventional approach (that does not utilize a dependency graph or selective hiding) and the dynamic content rendering system 214.

In particular, the example table 600 shows example load times for elements of a webpage (www.jabong.com) that includes visual elements with dynamic digital content. As shown in FIG. 6, the table 600 includes example load times for target elements including a logo, main banner, gallery thumbnails, and a heading. In addition, the table 600 shows corresponding types of dynamic digital content (e.g., dynamic modifications) provided via visual elements of the webpage display. In the example shown in FIG. 6, dynamic digital content is identified and served via ADOBE® TARGET® and rendered using the dynamic content rendering system 214 described herein as compared to conventional systems for rendering web content. ADOBE® TARGET® is a registered trademark or trademark of Adobe Systems Incorporated in the United States and/or other countries.

By implementing features and functionality described herein, the dynamic content rendering system 214 provides dynamic digital content for display without flicker and reduces load time for each of the dynamic elements, as shown in the table 600. In particular, the dynamic content rendering system 214 reduces load time for the logo by 461 ms (54%), the main banner by 569 ms (59%), a first gallery thumbnail by 500 ms (49%), a second gallery thumbnail by 475 ms (47%), and the heading by 714 ms (69%) over conventional methods. As a result, the dynamic content rendering system 214 substantially reduces load times over conventional methods while controlling the extent of flicker on the page.

Figure 7:
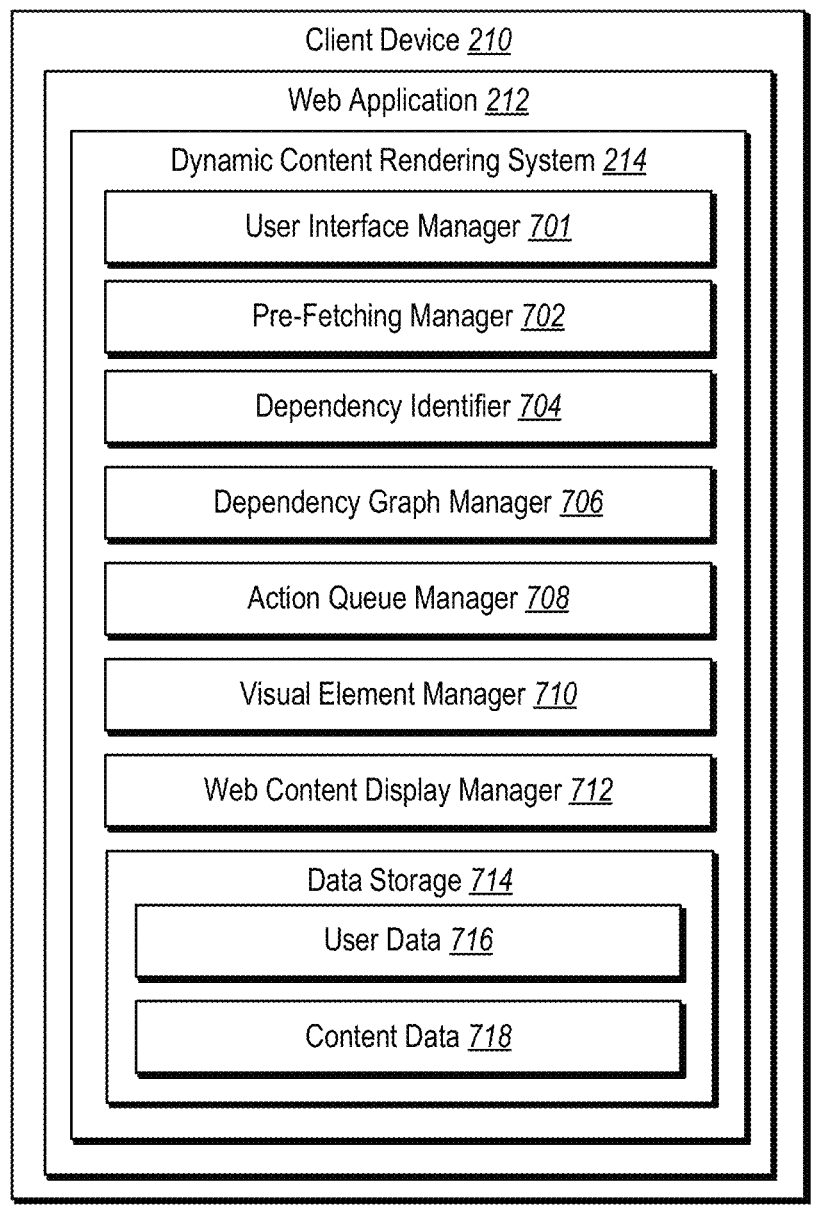
FIG. 7 illustrates a schematic diagram of an example dynamic content rendering system implemented on a client device in accordance with one or more embodiments.

Turning now to FIG. 7, additional detail will be provided regarding components and capabilities of an example architecture for the dynamic content rendering system 214 that may be implemented on the client device 210, server device(s) 202, or on a combination of the client device 210 and the server device(s) 202. In particular, FIG. 7 illustrates one implementation of the client device 210 having similar features and functionality associated with one or more embodiments described above. For example, the dynamic content rendering system 214 may provide features and functionality associated with providing dynamic content via a graphical user interface of the client device 210 without flicker.

As shown in FIG. 7, the client device 210 includes a web application 212. The web application 212 can include a web browser application or other application operating on the client device 210 that provides digital content via a graphical user interface of the client device 210. The web application 212 can further include the dynamic content rendering system 214, which includes a user interface manager 701, a pre-fetching manager 702, a dependency identifier 704, a dependency graph manager 706, an action queue manager 708, a visual element manager 710, a web content display manager 712, and data storage 714, which includes user data 716 and content data 718. While FIG. 7 shows one embodiment in which the dynamic content rendering system 214 is implemented as part of the web application 212, in one or more embodiments, the dynamic content rendering system 214 is implemented independent from the web application 212.

In one or more embodiments, components of the dynamic content rendering system 214 may, for example, be implemented as one or more stand-alone applications, as one or more modules of an application, as one or more plug-ins, as one or more library functions or functions that may be called by other applications (e.g., a web application), and/or as a cloud-computing model. Thus, one or more components of the dynamic content rendering system 214 may be implemented as a stand-alone application, such as a desktop or mobile application. Furthermore, one or more components of the dynamic content rendering system 214 may be implemented as one or more web-based applications hosed on a remote server (e.g., server device(s) 202). Alternatively or additionally, one or more components of the dynamic content rendering system 214 may be implemented in a suite of mobile device application or "apps." To illustrate, one or more components of the dynamic content rendering system 214 may be implemented in one or a combination of different applications including, but not limited to ADOBE® TARGET® ADOBE® ANALYTICS® and/or MOBILE SDK®. "ADOBE®," "ADOBE® TARGET®" "ADOBE® ANALYTICS®" and/or "MOBILE SDK®" are either registered trademarks or trademarks of Adobe Systems Incorporated in the United States and/or other countries.

While FIG. 7 shows one example embodiment in which the components 701-718 are implemented on the client device 210, it will be understood that the components 701-718 may be implemented wholly or partially on the client device 210, one or more server device(s), or a combination of both. In addition, while FIG. 7 shows that the data storage 714 is implemented entirely on the client device 210, in one or more embodiments, the information contained within the data storage 714 can be located within a corresponding data storage on the server device(s) 202 and/or stored collectively between data storages accessible to the client device 210 and/or the server device(s) 202.

As shown in FIG. 7, the dynamic content rendering system 214 includes a user interface manager 701 that provides a graphical user interface via the client device 210 (e.g., the user interface 504). In one or more embodiments, the user interface manager 701 provides a link or URL via a graphical user interface that enables a user of the client device 210 to interact with and select the link or URL. In response to detecting a selection of the link or URL, the dynamic content rendering system 214 provides a request to the server device(s) 202 and receives a web document including action items associated with loading and rendering web content via the graphical user interface of the client device 210. As mentioned above, the web document can include any number of action items including instructions for rendering dynamic digital content via the graphical user interface.

As shown in FIG. 7, the dynamic content rendering system 214 includes a pre-fetching manager 702. The pre-fetching manager can request, identify, obtain, fetch, and/or receive digital content. In one or more embodiments, the pre-fetching manager 702 analyzes the action items of the received web document and identifies any action items that depend from external resources (e.g., third-party server devices). For example, in one or more embodiments, the pre-fetching manager 702 identifies each of the action items of the web document that reference external web content including dynamic digital content and/or default digital content. The pre-fetching manager 702 can pre-fetch the external digital content by providing a request to the external sources (e.g., third-party server devices) for the external web content. In one or more embodiments, the pre-fetching manager 702 pre-fetches the external web content prior to performing or otherwise executing any of the action items.

As further shown in FIG. 7, the dynamic content rendering system 214 includes a dependency identifier 704. In one or more embodiments, the dependency identifier 704 analyzes the action items of the web document to identify any dependencies between the action items. In addition, in one or more embodiments, the dependency identifier 704 determines dependency scores for the action items based on a number of dependencies between a given action item and other action items from the web document.

As further shown in FIG. 7, the dynamic content rendering system 214 includes a dependency graph manager 706. In one or more embodiments, the dependency graph manager 706 generates a dependency graph representative of the identified dependencies between the action items of the web document. As an example, the dependency graph manager 706 can generate a dependency tree including nodes representative of action items and edges representative of dependencies between the action items. As an alternative, the dependency graph manager 706 can generate an alternative data structure representative of the dependencies between action items of the web document.

As mentioned above, and as shown in FIG. 7, the dynamic content rendering system 214 includes an action queue manager 708. In one or more embodiments, the action queue manager 708 generates an action queue including a sequence of action items based on the dependency graph. For example, the action queue manager 708 can add each of the independent action items from the web document based on the dependency graph. In one or more embodiments, the action queue manager 708 adds any action items having a dependency score indicative of an independent action item.

In addition to creating the action queue, the action queue manager 708 can manage the action queue by updating the action queue to reflect updated dependencies between the action items. For example, as one or more independent action items are implemented, the action queue manager 708 can update the action queue to include dependent action items that become independent in accordance with the dependency graph. For example, when an action item becomes independent as a result of implementing another action item, the action queue manager 708 can update the action queue by adding the newly independent action item to the action queue.

As further shown, the dynamic content rendering system 214 includes a visual element manager 710. In one or more embodiments, the visual element manager 710 manages visibility of visual elements of a web document. For example, in one or more embodiments, the visual element manager 710 identifies any visual elements associated with dynamic digital content to be rendered via a webpage display. For instance, the visual element manager 710 can analyze the action items of the web document to identify any visual elements associated with providing dynamic digital content via a graphical user interface of the client device 210.

In one or more embodiments, the visual element manager 710 selectively hides the visual elements associated with dynamic digital content. For example, in one or more embodiments, the visual element manager 710 hides visual elements by preventing display of web content therein. For instance, where an action item (or multiple action items) associated with a visual element includes a reference to dynamic digital content, the visual element manager 710 can apply or modify a visibility parameter (e.g., a hidden styling) within the DOM such that a dynamic visual element is not displayed within the webpage (e.g., when the DOM is in ready state).

In one or more embodiments, the visual element manager 710 hides the dynamic visual element until the dynamic visual element has been loaded into the DOM, dynamic digital content associated with the visual element is received by the client device 210, and/or until action items corresponding to the dynamic visual element have been completed. For example, where one or more action items associated with a visual element reference both default digital content and dynamic digital content, the visual element manager 710 can prevent display of the default digital content within the visual element. Further, upon receipt of the dynamic digital content (or satisfaction of other criteria), the visual element manager 710 can reveal the visual element to facilitate display of the dynamic digital content therein. For instance, the visual element manager 710 can modify the visibility parameter for the dynamic visual element in the DOM. In this way, the visual element manager 710 prevents inadvertent display of default digital content or other digital content not intended for the user of the client device 210.

As further shown in FIG. 7, the dynamic content rendering system 214 includes a web content display manager 712. In one or more embodiments, the web content display manager 712 renders digital content via a webpage. In particular, the web content display manager 712 provides digital content including dynamic digital content and default digital content in accordance with associated action items. For example, in one or more embodiments, the web content display manager 712 renders digital content by performing instructions of associated action items of the web document.

In one or more embodiments, the web content display manager 712 performs the action items in accordance with the action queue. For example, the web content display manager 712 can perform one or more action items of the action queue simultaneously without waiting for one or more additional action items to resolve. In addition, as the action queue manager 708 updates the action queue by adding one or more new action items to the action queue, the web content display manager 712 can perform the new action items in accordance with the updated action queue.

In addition to rendering digital content in accordance with the action queue, the web content display manager 712 additionally renders digital content within respective visual elements of the webpage (e.g., based on whether the visual elements are hidden by the visual element manager 710). For example, where one or more action items exclusively reference default digital content with respect to a default visual element, the web content display manager 712 can render the default digital content therein as soon as the default digital content is available. Alternatively, where one or more action items associated with a dynamic visual element reference dynamic digital content causing the visual element manager 710 to hide the dynamic visual element, the visual element manager 210 can determine whether the client device 210 has received the dynamic digital content (or other criteria) prior to providing an indication to the web content display manager 712 to render the dynamic digital content within the visual element.

As further shown, the dynamic content rendering system 214 includes a data storage 714 including user data 716 and content data 718. The user data 716 can include any information about the user of the client device 210. For example, the user data 716 can include profile information about the user (e.g., demographic information, location information, etc.) as well as behavioral data of the user (e.g., with respect to the web application 212). In one or more embodiments, the user data 716 includes any information about the user and/or client device 210 used by the dynamic content rendering system 214 and/or content delivery system 204 for identifying digital content to deliver to the client device 210.

The content data 718 can similarly include any information about digital content to be provided to the user of the client device 210. For example, content data 718 can include default digital content, dynamic digital content, and data used for matching one or more digital content items with a user of the client device 210. For instance, the dynamic content rendering system 214 can analyze content data 718 to identify a specific image, video, discount, text, or other web content to provide to a user based on a correlation between the content data 718 and the user data 716.

As discussed above, the dynamic content rendering system 214 provides many benefits and improvements over conventional methods and systems for providing dynamic web content. In particular, the dynamic content rendering system 214 provides a number of benefits for providing dynamic digital content while reducing flicker when loading a webpage display. As an example, by selectively hiding and unhiding visual elements of a webpage, the dynamic content rendering system 214 reduces flicker without hiding an entire webpage, as performed by one or more conventional systems.

In particular, one or more conventional methods reduce flicker by setting an opacity of an entire webpage to zero prior to loading any content from the webpage. In particular, some conventional methods implement a code that applies zero opacity to an entire webpage for the entire time that the webpage loads in an effort to prevent flicker caused by providing dynamic digital content within the webpage display. Setting the opacity of the entire webpage to zero, however, hides the body of an entire webpage and prevents a user from seeing any digital content or visual elements, even where the digital content is ready for display. As a result, a viewer of the webpage experiences a delay in which no content is displayed until the entire webpage is loaded or until a predefined period of time has passed. As outlined above, the dynamic content rendering system 214 can improve these shortcomings by selectively hiding visual elements, applying action items based on a dependency graph, and/or selectively unhiding visual elements as action items are completed.

Moreover, one or more embodiments described herein facilitate providing dynamic digital content without flicker within a variety of frameworks and implementations. In particular, the dynamic content rendering system 214 can perform features and functionalities described herein without modifying original DOM structure. For example, the dynamic content rendering system 214 can implement features and functionality herein without modifying essential attributes in the DOM structure and utilizing existing frameworks of DOMs from a number of different platforms (e.g., React, Angular2, Backbone, jQuery). Accordingly, hiding visual elements, preprocessing the action items, and applying dynamic digital content is not affected by the way different frameworks work. Accordingly, the dynamic content rendering system 214 provides flexibility and wide applicability across a variety of frameworks.

For example, when implementing the dynamic content rendering system 214 within the Angular framework, the dynamic content rendering system 214 can utilize a render directive which can be used as a hook to call various acts performed herein and apply the dynamic digital content without flicker. Similarly, when implementing the dynamic content rendering system 214 within the React framework, the dynamic content rendering system 214 uses a "View- ContentLoaded" event as a hook to apply dynamic digital content without flicker. The Backbone framework provides events on render to show which can be registered and applies dynamic digital content in accordance with one or more embodiments described herein. The dynamic content rendering system 214 can similarly apply other frameworks including Ember, Aurelia, Vue, Cycle, etc., which have similar ways of hooking dynamic digital content with view render. Accordingly, one or more embodiments described herein for providing dynamic digital content without flicker can be implemented in connection with a number of frameworks.

In addition, the dynamic content rendering system 214 can implement one or more embodiments described herein in single page applications (SPAs). In particular, in SPAs, a page does not reload when the view is changed. Nevertheless, because SPAs use similar frameworks as those mentioned above, the dynamic content rendering system 214 can provide features and functionality described herein in connection with SPAs by using hooks provided by the above-mentioned frameworks.

For example, SPAs often use Ajax to communicate with a backend server and fetch data to be loaded in a web application. The dynamic content rendering system 214 can utilize Ajax calls to retrieve default and dynamic digital content in accordance with one or more embodiments described herein. For example, the SPAs can fetch dynamic digital content from the server device(s) 202 using an Ajax call that facilitates requesting dynamic digital content from the server device(s) 202 and/or one or more third-party server devices.

In one or more embodiments, the dynamic content rendering system 214 fetches dynamic digital content actions per view on initial page load. In addition, or as an alternative where a user interacts with a webpage display while building the page, the dynamic content rendering system 214 can additionally fetch dynamic digital content on the fly in accordance with one or more embodiments described herein. Accordingly, in one or more embodiments, the dynamic content rendering system 214 fetches and renders dynamic digital content on the fly without reloading the entire webpage.

Furthermore, the dynamic content rendering system 214 can perform features and functionality described herein independent of various browsers which have corresponding rendering engines. For example, one or more embodiments described herein have been verified on browsers including Chrome, Firefox, Internet Explorer, and Safari, among others. Moreover, one or more embodiments described herein have been verified with mobile rendering engines, notwithstanding different mechanisms for rendering webpages.

Figure 8:
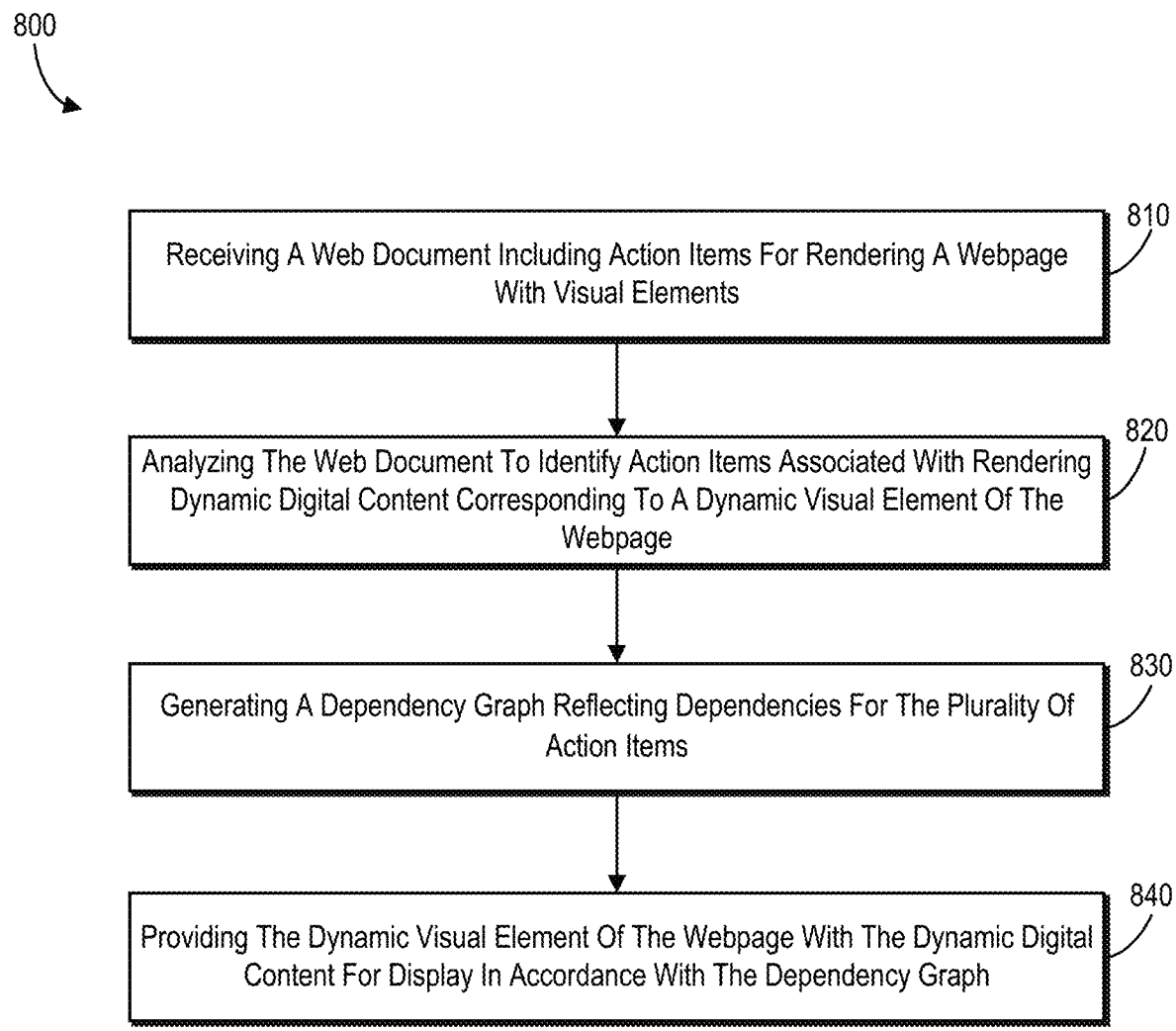
FIG. 8 illustrates a flow diagram of an example series of acts for providing dynamic digital content via a display device in accordance with one or more embodiments.
Figure 9:
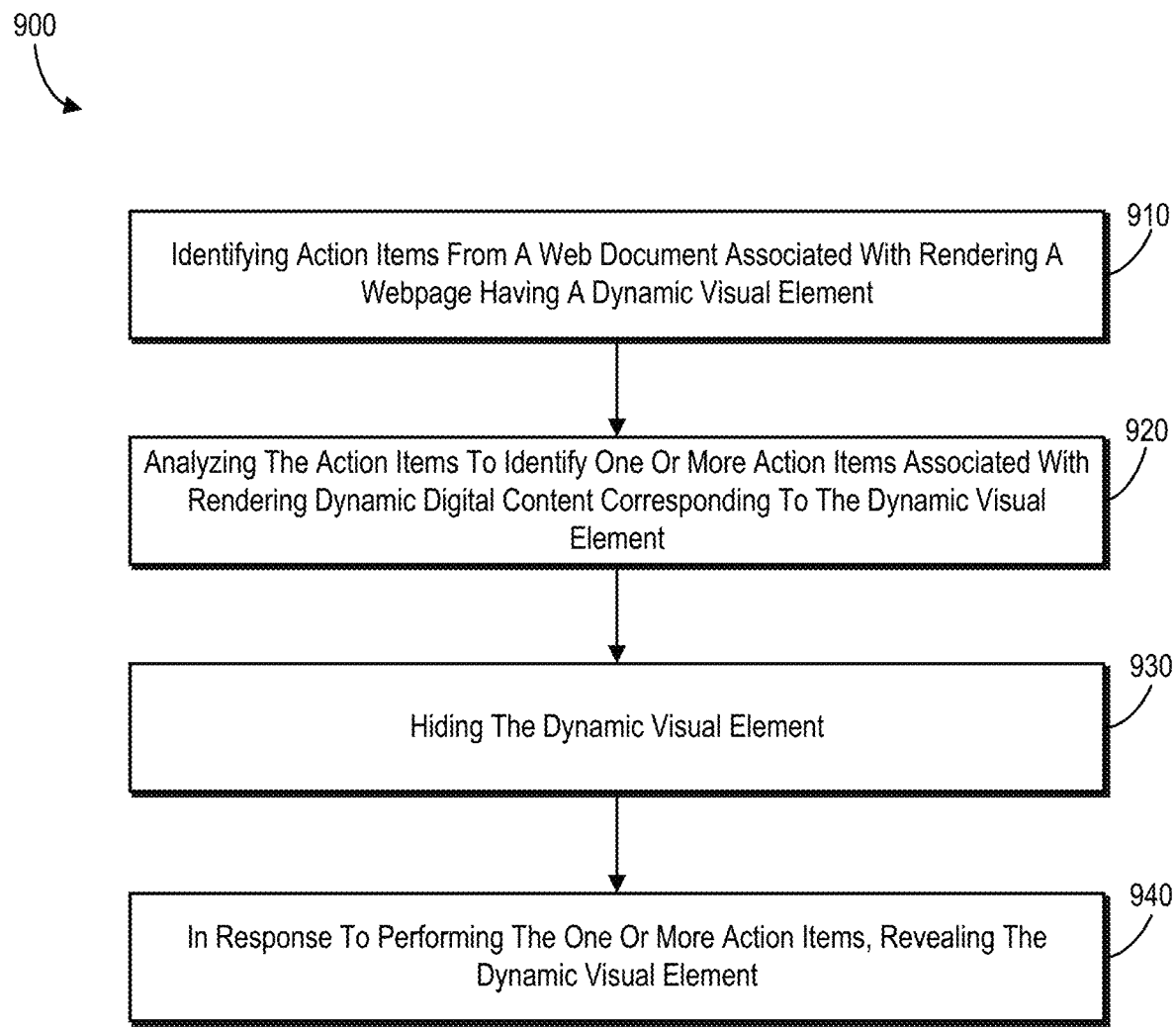
FIG. 9 illustrates a flow diagram of another example series of acts for providing dynamic digital content via a display device in accordance with one or more embodiments.

Turning now to FIGS. 8-9, these figures illustrate flowcharts including series of acts 800, 900 of providing dynamic digital content without flicker. While FIGS. 8-9 illustrate acts according to individual embodiments, alternative embodiments may omit, add to, reorder, and/or modify any of the acts shown in FIGS. 8-9. The acts of FIGS. 8-9 can be performed as part of a method. Alternatively, a non-transitory computer readable medium can comprise instructions, that when executed by one or more processors, cause a computing device to perform the acts of FIGS. 8-9. In still further embodiments, a system can perform the acts of FIGS. 8-9.

FIG. 8 illustrates a flowchart of an example series of acts 800 for providing dynamic digital web content without flicker. For example, the series of acts 800 includes an act 810 of receiving a web document including action items for rendering a webpage with visual elements. In one or more embodiments, the act 810 includes receiving, via a server device(s) 202, a web document including action items for rendering a webpage with visual elements. In one or more embodiments, the action items include a plurality of JavaScript Object Notation (JSON) objects associated with rendering digital content. In addition, in one or more embodiments, the web document includes a hyper-text markup language (HTML) document.

As further shown in FIG. 8, the series of acts 800 includes an act 820 of analyzing the web document to identify action items associated with rendering dynamic digital content corresponding to a dynamic visual element of the webpage. For example, in one or more embodiments, the act 820 includes, prior to performing the action items for rendering the webpage, analyzing the web document to identify a plurality of action items associated with rendering dynamic digital content corresponding to a dynamic visual element of the webpage where the dynamic visual element corresponds to default digital content.

As further shown in FIG. 8, the series of acts 800 includes an act 830 of generating a dependency graph reflecting dependencies for the plurality of action items. For example, in one or more embodiments, the act 830 includes, prior to performing the action items for rendering the webpage, generating a dependency graph reflecting dependencies for the plurality of action items by determining that a second action item of the plurality of action items depends from a first action item of the plurality of action items. In addition, prior to performing the action items for rendering the webpage, in one or more embodiments, the series of acts 800 include identifying that the first action item or the second action item depends on a dynamic digital content item from an external resource. In one or more embodiments, the series of acts 800 includes pre-fetching the dynamic digital content item from the external resource by providing a request to the external resource for the dynamic digital content item.

As further shown in FIG. 8, the series of acts 800 includes an act 840 of providing the dynamic visual element of the webpage with the dynamic digital content for display in accordance with the dependency graph. For example, in one or more embodiments, the act 840 includes providing the dynamic visual element of the webpage with the dynamic digital content for display without displaying the default digital content by performing the first action item prior to the second action item in accordance with the dependency graph.

In one or more embodiments, the series of acts 800 includes hiding the dynamic visual element in response to identifying the plurality of action items associated with rendering the dynamic digital content. In one or more embodiments, the series of acts 800 includes hiding the dynamic visual element by modifying a visibility parameter of the dynamic visual element within a document object model ("DOM") utilized to render the webpage. In one or more embodiments, the series of acts 800 includes determining that the first action item and the second action item have been performed. Further, in response to determining that the first action item and the second action item have been performed, in one or more embodiments, the series of acts 800 includes revealing the dynamic visual element and providing the dynamic digital content within the dynamic visual element on the webpage.

In one or more embodiments, the series of acts 800 includes generating an action queue including the first action item based on the dependency graph. Further, in one or more embodiments, the series of acts 800 includes rendering the dynamic digital content by performing the first action item in accordance with the action queue. In addition, in one or more embodiments, the series of acts 800 includes analyzing the dependency graph to determine that the first action item is an independent action item that does not depend on another action item of the action items. Further, in one or more embodiments, the series of acts 800 includes adding the first action item to the action queue based on determining that the first action item is an independent action item. Moreover, in one or more embodiments, in response to performing the first action item in accordance with the action queue, the series of acts 800 includes updating the action queue to include the second action item based on the dependency graph. In one or more embodiments, the series of acts 800 includes performing the second action item in accordance with the updated action queue.

FIG. 9 illustrates a flowchart of another example series of acts 900 for providing dynamic digital content without flicker. In particular, as shown in FIG. 9, the series of acts 900 includes an act 910 of identifying action items from a web document associated with rendering a webpage having a dynamic visual element. For example, in one or more embodiments, the act 910 includes identifying, from a web document, a plurality of action items associated with rendering a webpage having a dynamic visual element. In one or more embodiments, the plurality of action items include a plurality of JavaScript Object Notation (JSON) objects associated with rendering digital content items and the web document includes a hyper-text markup language (HTML) document.

As further shown in FIG. 9, the series of acts 900 includes an act 920 of analyzing the action items to identify one or more action items associated with rendering dynamic digital content corresponding to the dynamic visual element. For example, in one or more embodiments, the act 920 includes analyzing the plurality of action items to identify one or more action items associated with rendering dynamic digital content corresponding to the dynamic visual element. In one or more embodiments, the series of acts 900 further includes identifying at least one action item of the plurality of action items that depends on digital content from an external resource. Further, in one or more embodiments, the series of acts 900 includes pre-fetching the digital content from the external resource by providing a request to the external resource for the digital content.

As further shown in FIG. 9, the series of acts 900 includes an act 930 of hiding the dynamic visual element. For example, in one or more embodiments, the act 930 includes hiding the visual element in response to identifying the one or more action items associated with rendering the dynamic digital content. In one or more embodiments, the webpage further includes a default visual element. Further, in one or more embodiments, the series of acts 900 includes providing the default visual element of the webpage for display via a display device while the dynamic visual element is hidden.

As further shown in FIG. 9, the series of acts 900 includes an act 940 of revealing the dynamic visual element in response to performing the one or more action items. For example, in one or more embodiments, in response to performing the one or more action items, the act 940 includes revealing the visual element by providing, via the display device, the dynamic visual element with the dynamic digital content within the webpage.

In one or more embodiments, the series of acts 900 includes determining dependencies between the plurality of action items. In one or more embodiments, the series of acts 900 further includes generating a dependency graph reflecting dependencies of the plurality of action items. Further, in one or more embodiments, the series of acts 900 includes generating an action queue based on the determined dependencies where the action queue includes a first subset of the plurality of action items based on associated dependencies. In addition, in one or more embodiments, the series of acts 900 includes rendering the dynamic digital content by performing the subset of the plurality of action items in accordance with the action queue.

In one or more embodiments, the first subset of the plurality of action items includes the one or more action items. In addition, in one or more embodiments, the series of acts 900 includes polling a data object model (DOM) for the webpage to determine that the dynamic visual element is loaded into the DOM. Further, based on determining that the dynamic visual element is loaded into the DOM, in one or more embodiments, the series of acts 900 includes performing the one or more action items associated with rendering the dynamic digital content in accordance with the action queue.

In one or more embodiments, the series of acts 900 includes identifying the first subset of the plurality of action items by identifying one or more independent action items of the plurality of action items that do not depend from other actions of the plurality of action items. In addition, in one or more embodiments, generating the action queue includes adding the one or more independent action items to the action queue. Further, in response to performing the subset of the plurality of action items, in one or more embodiments, the series of acts 900 includes updating the action queue to include a second subset of action items based on the dependency graph. In one or more embodiments, the series of acts 900 further includes rendering digital content associated with the second subset of the plurality of action items via the display device by performing the second subset of action items in accordance with the updated action queue.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
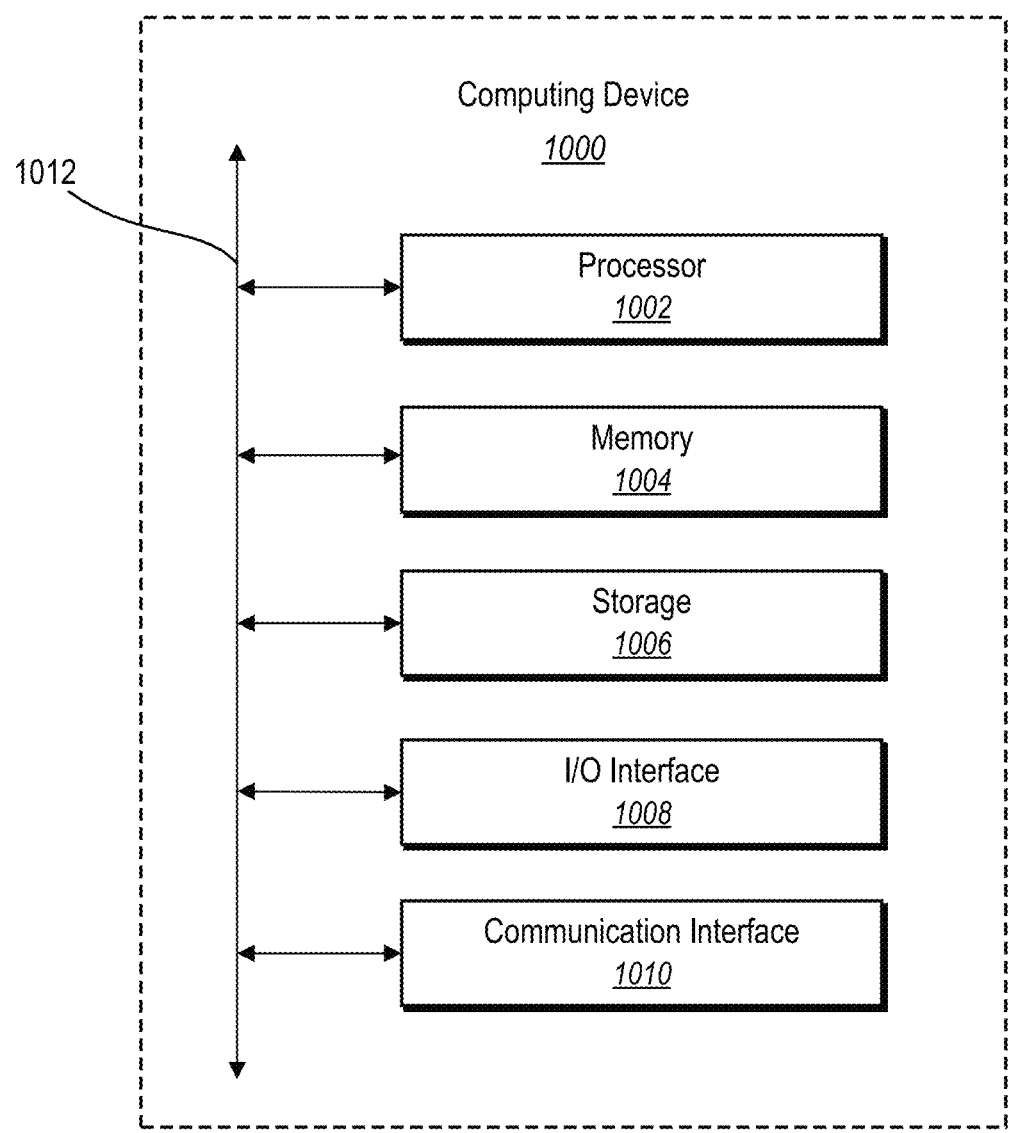
FIG. 10 illustrates a block diagram of an example computing device in accordance with one or more embodiments.

FIG. 10 illustrates a block diagram of exemplary computing device 1000 that may be configured to perform one or more of the processes described above. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions for digitizing real-world objects, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions related to object digitizing processes (e.g., digital scans, digital models).

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A system comprising:
at least one processor; and
a non-transitory computer readable medium storing instructions thereon that, when executed by the at least one processor, cause the system to:
identify, from a web document, a plurality of action items associated with rendering a webpage having a dynamic visual element;
analyze the plurality of action items to identify a set of action items associated with rendering dynamic digital content corresponding to the dynamic visual element;
in response to identifying the set of action items associated with rendering the dynamic digital content, temporarily prohibit display of the dynamic visual element by hiding the dynamic visual element until performing the set of action items associated with rendering the dynamic digital content corresponding to the dynamic visual element is complete;
generate, from a dependency graph comprising the set of action items, an action queue comprising a first subset of independent action items that, when completed, updates to a second subset of independent action items; and
in response to completing at least the second subset of independent action items of the set of action items according to the dependency graph, reveal the dynamic visual element by providing, via a display device, the dynamic visual element with the dynamic digital content for display within the webpage without previously displaying default digital content that comprises renderable visual content.

2. The system of claim 1, further comprising instructions that, when executed by the at least one processor, cause the system to:
update the action queue after completing a given subset of independent action items to identify a next subset of independent action items that, prior to performance of the given subset of independent action items, depended on at least one action item in the given subset of independent action items; and
in response to completing the next subset of independent action items, reveal the dynamic visual element.

3. The system of claim 1, further comprising instructions that, when executed by the at least one processor, cause the system to:
determine dependencies between the plurality of action items;
generate the dependency graph to reflect dependencies of the plurality of action items; and
generate the action queue based on the determined dependencies, the action queue comprising a first subset of the plurality of action items based on associated dependencies; and
render the dynamic digital content by performing the first subset of the plurality of action items in accordance with the action queue.

4. The system of claim 3,
further comprising instructions that, when executed by the at least one processor, cause the system to:
poll a data object model (DOM) for the webpage to determine that the dynamic visual element is loaded into the DOM; and
based on determining that the dynamic visual element is loaded into the DOM, perform the set of action items associated with rendering the dynamic digital content in accordance with the action queue.

5. The system of claim 4, further comprising instructions that, when executed by the at least one processor, cause the system to:
identify the first subset of independent action items by identifying one or more independent action items of the plurality of action items that do not depend from other actions of the plurality of action items; and wherein generating the action queue comprises adding the one or more independent action items to the action queue.

6. The system of claim 1, further comprising instructions that, when executed by the at least one processor, cause the system to perform a given subset of independent action items by simultaneously executing each independent action item of the given subset of independent action items.

7. The system of claim 1, wherein at least one action item of the plurality of action items comprises replacing a default block of text with a dynamic block of text without previously displaying the default block of text.

8. The system of claim 1, further comprising instructions that, when executed by the at least one processor, cause the system to:
temporarily prohibit display of the dynamic visual element and an additional dynamic visual element by hiding the dynamic visual element and the additional dynamic visual element while performing the set of action items; and while hiding the dynamic visual element and the additional dynamic visual element, switch the dynamic visual element from a first position to a second position and the additional dynamic visual element from the second position to the first position; and
in response to switching the additional dynamic visual element to the first position and the dynamic visual element to the second position, reveal the dynamic visual element and the additional dynamic visual element by unhiding the dynamic visual element and the additional dynamic visual element.

9. A method comprising:
identifying a plurality of action items associated with rendering digital content within visual elements of a webpage based on a web document received via a server device;
analyzing the plurality of action items to identify a set of action items associated with rendering dynamic digital content corresponding to a dynamic visual element; in response to identifying the set of action items associated with rendering the dynamic digital content, temporarily prohibiting display of the dynamic visual element by hiding the dynamic visual element until performing the set of action items associated with rendering the dynamic digital content corresponding to the dynamic visual element is complete;
generating, from a dependency graph comprising the set of action items, an action queue comprising a first subset of independent action items that, when completed, updates to a second subset of independent action items; and
in response to completing at least the second subset of independent action items of the set of action items according to the dependency graph, revealing the dynamic visual element by providing, via a display device, the dynamic visual element with the dynamic digital content for display within the webpage without previously displaying default digital content that comprises renderable visual content.

10. The method of claim 9, further comprising:
updating the action queue after completing a given subset of independent action items to identify a next subset of independent action items that, prior to performance of the given subset of independent action items, depended on at least one action item in the given subset of independent action items; and
in response to completing the next subset of independent action items, revealing the dynamic visual element.

11. The method of claim 9, further comprising:
identifying the first subset of independent action items by identifying one or more independent action items of the plurality of action items that do not depend from other actions of the plurality of action items; and
wherein generating the action queue comprises adding the one or more independent action items to the action queue.

12. The method of claim 9, wherein performing a given subset of independent action items comprises simultaneously executing each independent action item of the given subset of independent action items.

13. A non-transitory computer readable medium storing instructions thereon that, when executed by at least one processor, cause a computer system to:
receive, via a server device, a web document comprising action items for rendering a webpage with visual elements;
prior to performing the action items for rendering the webpage:
analyze the web document to identify a plurality of action items associated with rendering dynamic digital content corresponding to a dynamic visual element of the webpage, wherein the dynamic visual element corresponds to default digital content that comprises renderable visual content; and
generate, from a dependency graph comprising a set of action items, an action queue comprising a first subset of independent action items that, when completed, updates to a second subset of independent action items reflecting dependencies for the plurality of action items by determining that a second action item of the plurality of action items depends from a first action item of the plurality of action items;
while performing the plurality of action items, including the first subset of independent action items prior to the second subset of independent action items in accordance with the dependency graph, temporarily prohibit display of the dynamic visual element; and
in response to completing at least the second subset of independent action items of the plurality of action items in accordance with the dependency graph, provide the dynamic visual element of the webpage with the dynamic digital content for display without previously displaying the default digital content that comprises the renderable visual content.

14. The non-transitory computer readable medium of claim 13, further comprising instructions that, when executed by the at least one processor, cause the computer system to:
generate the dependency graph to reflecting dependencies for the plurality of action items by determining dependency scores for each action item of the plurality of action items;
while temporarily prohibiting display of the dynamic visual element, perform the plurality of action items in order of the dependency scores; and
in response to performing the plurality of action items in the order of the dependency scores, provide the dynamic visual element for display.

15. The non-transitory computer readable medium of claim 13, further comprising instructions that, when executed by the at least one processor, cause the computer system to:

determine that the first subset of independent action items and the second subset of independent action items have been performed; and in response to determining that the first subset of independent action items and the second subset of independent action items have been performed, reveal the dynamic visual element and provide the dynamic digital content within the dynamic visual element on the webpage.

16. The non-transitory computer readable medium of claim 13, further comprising instructions that, when executed by the at least one processor, cause the computer system to temporarily prohibit display of the dynamic visual element by modifying a visibility parameter of the dynamic visual element within a document object model (DOM) utilized to render the webpage.

17. The non-transitory computer readable medium of claim 13, further comprising instructions that, when executed by the at least one processor, cause the computer system to:

update the action queue after completing a given subset of independent action items to identify a next subset of independent action items that, prior to performance of the given subset of independent action items, depended on at least one action item in the given subset of independent action items; and in response to completing the next subset of independent action items, reveal the dynamic visual element.

18. The non-transitory computer readable medium of claim 17, further comprising instructions that, when executed by the at least one processor, cause the computer system to generate the action queue by:

analyzing the dependency graph to determine that the first action item is an independent action items that do not depend on another action item of the plurality of action items; and adding the first subset of independent action items to the action queue based on determining that the first subset of independent action items are independent action items.

19. The non-transitory computer readable medium of claim 17, further comprising instructions that, when executed by the at least one processor, cause the computer system to perform a given subset of independent action items by simultaneously executing each independent action item of the given subset of independent action items.

20. The non-transitory computer readable medium of claim 13, further comprising instructions that, when executed by the at least one processor, cause the computer system to:

prior to performing the plurality of action items for rendering the webpage:

identify that at least one action item of the first subset of independent action items or the second subset of independent action items depend on a dynamic digital content item from an external resource; and pre-fetch the dynamic digital content item from the external resource by providing a request to the external resource for the dynamic digital content item.

* * * * *